United States Patent
Okada

(10) Patent No.: US 6,184,880 B1
(45) Date of Patent: Feb. 6, 2001

(54) AUTOMATIC GUI SYSTEM OPERATION DEVICE AND OPERATION MACRO EXECUTION DEVICE

(75) Inventor: Hidehiko Okada, Tokyo (JP)

(73) Assignee: NEC Corporation, Tokyo (JP)

( * ) Notice: Under 35 U.S.C. 154(b), the term of this patent shall be extended for 0 days.

(21) Appl. No.: 09/004,320

(22) Filed: Jan. 8, 1998

(30) Foreign Application Priority Data

Jan. 8, 1997 (JP) .................................................. 9-013121

(51) Int. Cl.$^7$ ...................................................... G06F 3/80

(52) U.S. Cl. ............................................ 345/333; 345/335

(58) Field of Search ..................................... 345/331, 334, 345/335, 339, 333, 701, 702, 703, 337; 711/156

(56) References Cited

U.S. PATENT DOCUMENTS

| | | | |
|---|---|---|---|
| 4,696,003 | * 9/1987 | Kerr et al. ............................. | 395/701 |
| 5,651,108 | * 7/1997 | Cain et al. .............................. | 345/340 |
| 5,793,948 | 8/1998 | Asahi et al. ...................... | 395/184.01 |
| 5,911,070 | * 6/1999 | Solton et al. .......................... | 395/701 |

FOREIGN PATENT DOCUMENTS

| | | |
|---|---|---|
| 1-237833 | 9/1989 | (JP) . |
| 2-41529 | 2/1990 | (JP) . |
| 2-244316 | 9/1990 | (JP) . |
| 4-76776 | 3/1992 | (JP) . |
| 4-302029 | 10/1992 | (JP) . |
| 5-35382 | 2/1993 | (JP) . |
| 5-135002 | 6/1993 | (JP) . |
| 5-173741 | 7/1993 | (JP) . |
| 6-28209 | 2/1994 | (JP) . |
| 6-95780 | 4/1994 | (JP) . |
| 6-274329 | 9/1994 | (JP) . |
| 6-332686 | 12/1994 | (JP) . |
| 6-348481 | 12/1994 | (JP) . |
| 7-56730 | 3/1995 | (JP) . |
| 7-84765 | 3/1995 | (JP) . |
| 7-84829 | 3/1995 | (JP) . |
| 7-253865 | 10/1995 | (JP) . |
| 8-29209 | 2/1996 | (JP) . |
| 8-153022 | 6/1996 | (JP) . |

OTHER PUBLICATIONS

"World of Visual Test 4.0", C Magazine (softback), vol. 8, No. 4 (issue 79), Apr. 1, 1996, pp. 26–55.

Kishi, Nobuko, "Redesign of User operated recording and playback tools in X Window", WISS'94, 1994, pp. 95–104.

Nielsen, Jakob, "Heuristic Evaluation of User Interfaces", CHI'90 Conference Proceedings, ISBN–0–201–50932–6, Apr. 1–5, 1990, pp. 249–256.

"Experimental evaluation method for user interfaces", ISBN–4–303–72860–8, (1993), pp. 21–27.

Information Processing Society Research Report, vol. 93, No. 80, Sep. 1993, pp. 17–24.

Mahajan, Rohit, "Visual and Textual Consistency Checking Tools for Graphical User Interfaces", Technical Report, CAR–TR–828, Human–Computer Interaction Laboratory, Center for Automation Research, University of Maryland, Oct. 22, 1997, pp. 1–20.

(List continued on next page.)

Primary Examiner—Raymond J. Bayerl
Assistant Examiner—Cao H. Nguyen
(74) Attorney, Agent, or Firm—Foley & Lardner

(57) ABSTRACT

A screen of a system is comprehensively shifted by automatically operating a system having a GUI and images on the screen are recorded at respective time instances. Operation objects of the system displayed on the screen is detected by an operation object detection unit (102) and sequentially selected by an operation object selection unit (108) such that the detected operation objects are comprehensively operated. An operation event for executing an operation of the selected operation object is generated by an operation event generator unit (109) and output to a program execution unit (101) for controlling an execution of an execution program of the system. A screen image recording unit (103) acquires the screen image from the program execution unit (101) and records it.

10 Claims, 34 Drawing Sheets

OTHER PUBLICATIONS

Nikkei Open System, No. 40, Jul. 1996, pp. 247–257.
ANDA, Hidehiko, et al, "Proposal for 'GUI Tester 2', a tool that evaluates the thoroughness of GUI designs," Information Processing Society Research Report, 97–HI–73, Jul. 11, 1997, pp. 7–12.
Nielsen et al., "Heuristic Evaluation of User Interfaces" *CHI 90 Proceedings* pp. 249–256 (1990).

"Practical Evaluation Method of User Interfaces" *ISBM* pp. 21–27 (1993).
Kato et al., "A Human Interface Design Checklist and its Usability" pp. 17–24 (1993).
Mahahan et al., "Visual and Textual Consistency Checking Tools for Graphical User Interfaces"pp. 1–26 (1996).
"Nikkeo Open System" pp. 247–257 (1996).

* cited by examiner

A : \sample\sample. exe

| Window | Operation Object | Label | Upper Left Coordinates | Lower Right Coordinates | Font | Size |
|---|---|---|---|---|---|---|
| Sample | Menu | Letter | (36,60) | (84,96) | Gothic | 12 |
| | Menu | Page | (85,60) | (157,96) | Gothic | 12 |

| $0 | | | | | | | | | |
|---|---|---|---|---|---|---|---|---|---|
| ID | ID | Operation Object | Label | Window | Upper Left | Lower Right | Font | Size | Exec. |
| #0 | #1 | Menu | Letter | Sample | (36, 60) | (84, 96) | Gothic | 12 | not yet |
| | #2 | Menu | Page | Sample | (85, 60) | (157, 96) | Gothic | 12 | not yet |

FIG.5

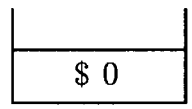

FIG.6

| $0 | | | | | | | | | |
|---|---|---|---|---|---|---|---|---|---|
| ID | ID | Operation Object | Label | Window | Upper Left | Lower Right | Font | Size | Exec. |
| #0 | #1 | Menu | Letter | Sample | (36, 60) | (84, 96) | Gothic | 12 | done |
| | #2 | Menu | Page | Sample | (85, 60) | (157, 96) | Gothic | 12 | not yet |

FIG.7

| Operation Object | Operation Event |
|---|---|
| Menu | Click (x,y) |
| SubMenu | Click (x,y) |
| OptionButton | Click (x,y) |
| PushButton | Click (x,y) |

FIG.8

| Window | Operation Object | Label | Upper Left | Lower Right | Font | Size |
|---|---|---|---|---|---|---|
| Sample | Menu | Letter | (36, 60) | (84, 96) | Gothic | 12 |
| | SubMenu | Font | (50, 94) | (145, 117) | Gothic | 12 |
| | SubMenu | Size | (50, 118) | (145, 141) | Gothic | 12 |
| | Menu | Page | (85, 60) | (157, 96) | Gothic | 12 |

| $1 | | | | | | | | | |
|---|---|---|---|---|---|---|---|---|---|
| ID | ID | Operation Object | Label | Window | Upper Left | Lower Right | Font | Size | Exec. |
| #1 | #3 | SubMenu | Font | Sample | (50, 94) | (145, 117) | Gothic | 12 | not yet |
|  | #4 | SubMenu | Size | Sample | (50, 118) | (145, 141) | Gothic | 12 | not yet |

| Window | Operation Object | Label | Upper Left | Lower Right | Font | Size |
|---|---|---|---|---|---|---|
| Sample | Menu | Letter | (36,60) | (84,96) | Gothic | 12 |
| | Menu | Page | (85,60) | (157,96) | Gothic | 12 |
| Letter Font | Option Button | Ming | (147,204) | (161,218) | Gothic | 12 |
| | Option Button | Gothic | (147,229) | (161,243) | Gothic | 12 |
| | Option Button | Roman | (292,204) | (316,218) | Gothic | 12 |
| | Option Button | Sans Serif | (292,229) | (306,243) | Gothic | 12 |
| | Push Button | OK | (231,279) | (315,303) | Gothic | 12 |
| | Push Button | Cancel | (329,279) | (413,303) | Gothic | 12 |

| $3 | | | | | | | | | |
|---|---|---|---|---|---|---|---|---|---|
| ID | ID | Operation Object | Label | Window | Upper Left | Lower Right | Font | Size | Exec. |
| #3 | #5 | Option Button | Ming | Letter Font | (147, 204) | (161, 218) | Gothic | 12 | not yet |
| | #6 | Option Button | Gothic | Letter Font | (147, 229) | (161, 243) | Gothic | 12 | not yet |
| | #7 | Option Button | Roman | Letter Font | (292, 204) | (316, 218) | Gothic | 12 | not yet |
| | #8 | Option Button | Sans Serif | Letter Font | (292, 229) | (306, 243) | Gothic | 12 | not yet |
| | #9 | Push Button | OK | Letter Font | (231, 279) | (315, 303) | Gothic | 12 | not yet |
| | #10 | Push Button | Cancel | Letter Font | (329, 279) | (413, 303) | Gothic | 12 | not yet |

FIG.15

|       |
|-------|
| $ 3   |
| $ 1   |
| $ 0   |

FIG.16

| $5  |      |                     |        |        |               |                |      |      |        |
|-----|------|---------------------|--------|--------|---------------|----------------|------|------|--------|
| ID  | ID   | Operation Object    | Label  | Window | Upper Left    | Lower Right    | Font | Size | Exec.  |
| #5  |(none)| (none)              | (none) | (none) | (none)        | (none)         |(none)|(none)| (none) |

FIG.17

|       |
|-------|
| $ 5   |
| $ 3   |
| $ 1   |
| $ 0   |

FIG.18

| $1 | | | | | | | | | |
|---|---|---|---|---|---|---|---|---|---|
| ID | ID | Operation Object | Label | Window | Upper Left | Lower Right | Font | Size | Exec. |
| #1 | #3 | SubMenu | Font | Sample | (50, 94) | (145, 117) | Gothic | 12 | done |
|  | #4 | SubMenu | Size | Sample | (50, 118) | (145, 141) | Gothic | 12 | not yet |

FIG.19

| $3 | | | | | | | | | |
|---|---|---|---|---|---|---|---|---|---|
| ID | ID | Operation Object | Label | Window | Upper Left | Lower Right | Font | Size | Exec. |
| #3 | #5 | Option Button | Ming | Letter Font | (147, 204) | (161, 218) | Gothic | 12 | done |
| | #6 | Option Button | Gothic | Letter Font | (147, 229) | (161, 243) | Gothic | 12 | not yet |
| | #7 | Option Button | Roman | Letter Font | (292, 204) | (316, 218) | Gothic | 12 | not yet |
| | #8 | Option Button | Sans Serif | Letter Font | (292, 229) | (306, 243) | Gothic | 12 | not yet |
| | #9 | Push Button | OK | Letter Font | (231, 279) | (315, 303) | Gothic | 12 | not yet |
| | #10 | Push Button | Cancel | Letter Font | (329, 279) | (413, 303) | Gothic | 12 | not yet |

FIG.20

| $0 | | | | | | | | | |
|---|---|---|---|---|---|---|---|---|---|
| ID | ID | Operation Object | Label | Window | Upper Left | Lower Right | Font | Size | Exec. |
| #0 | #1 | Menu | Letter | Sample | (36, 60) | (84, 96) | Gothic | 12 | done |
| | #2 | Menu | Page | Sample | (85, 60) | (157, 96) | Gothic | 12 | done |

FIG.21

| $1 | | | | | | | | | |
|---|---|---|---|---|---|---|---|---|---|
| ID | ID | Operation Object | Label | Window | Upper Left | Lower Right | Font | Size | Exec. |
| #1 | #3 | SubMenu | Font | Sample | (50, 94) | (145, 117) | Gothic | 12 | done |
| | #4 | SubMenu | Size | Sample | (50, 118) | (145, 141) | Gothic | 12 | done |

FIG.22

| $3 | | | | | | | | | |
|---|---|---|---|---|---|---|---|---|---|
| ID | ID | Operation Object | Label | Window | Upper Left | Lower Right | Font | Size | Exec. |
| #3 | #5 | Option Button | Ming | Letter Font | (147, 204) | (161, 218) | Gothic | 12 | done |
| | #6 | Option Button | Gothic | Letter Font | (147, 229) | (161, 243) | Gothic | 12 | not yet |
| | #7 | Option Button | Roman | Letter Font | (292, 204) | (316, 218) | Gothic | 12 | not yet |
| | #8 | Option Button | Sans Serif | Letter Font | (292, 229) | (306, 243) | Gothic | 12 | not yet |
| | #9 | Push Button | OK | Letter Font | (231, 279) | (315, 303) | Gothic | 12 | not yet |
| | #10 | Push Button | Cancel | Letter Font | (329, 279) | (413, 303) | Gothic | 12 | not yet |

FIG.23

| $5 | | | | | | | | | |
|---|---|---|---|---|---|---|---|---|---|
| ID | ID | Operation Object | Label | Window | Upper Left | Lower Right | Font | Size | Exec. |
| #5 | (none) | (none) | (none) | (none) | (none) | (none) | (none) | (none) | (none) |

FIG.24

| $6 | | | | | | | | | |
|---|---|---|---|---|---|---|---|---|---|
| ID | ID | Operation Object | Label | Window | Upper Left | Lower Right | Font | Size | Exec. |
| #6 | (none) | (none) | (none) | (none) | (none) | (none) | (none) | (none) | (none) |

FIG.25

| $7 | | | | | | | | | |
|---|---|---|---|---|---|---|---|---|---|
| ID | ID | Operation Object | Label | Window | Upper Left | Lower Right | Font | Size | Exec. |
| #7 | (none) | (none) | (none) | (none) | (none) | (none) | (none) | (none) | (none) |

FIG.26

| $8 | | | | | | | | | |
|---|---|---|---|---|---|---|---|---|---|
| ID | ID | Operation Object | Label | Window | Upper Left | Lower Right | Font | Size | Exec. |
| #8 | (none) | (none) | (none) | (none) | (none) | (none) | (none) | (none) | (none) |

FIG.27

| $9 | | | | | | | | | |
|---|---|---|---|---|---|---|---|---|---|
| ID | ID | Operation Object | Label | Window | Upper Left | Lower Right | Font | Size | Exec. |
| #9 | (none) | (none) | (none) | (none) | (none) | (none) | (none) | (none) | (none) |

FIG.28

| $10 | | | | | | | | | |
|---|---|---|---|---|---|---|---|---|---|
| ID | ID | Operation Object | Label | Window | Upper Left | Lower Right | Font | Size | Exec. |
| #10 | (none) | (none) | (none) | (none) | (none) | (none) | (none) | (none) | (none) |

FIG.29

| $4 | | | | | | | | | |
|---|---|---|---|---|---|---|---|---|---|
| ID | ID | Operation Object | Label | Window | Upper Left | Lower Right | Font | Size | Exec. |
| #4 | #11 | Option Button | 8 Point | Letter Size | (135, 179) | (149, 193) | Gothic | 12 | done |
| | #12 | Option Button | 9 Point | Letter Size | (135, 204) | (149, 218) | Gothic | 12 | done |
| | #13 | Option Button | 10 Point | Letter Size | (135, 229) | (149, 243) | Gothic | 12 | done |
| | #14 | Push Button | OK | Letter Size | (134, 267) | (218, 291) | Gothic | 12 | done |
| | #15 | Push Button | Cancel | Letter Size | (232, 267) | (316, 291) | Gothic | 12 | done |

FIG.30

| $11 | | | | | | | | | |
|---|---|---|---|---|---|---|---|---|---|
| ID | ID | Operation Object | Label | Window | Upper Left | Lower Right | Font | Size | Exec. |
| #11 | (none) | (none) | (none) | (none) | (none) | (none) | (none) | (none) | (none) |

FIG.31

| $12 | | | | | | | | | |
|---|---|---|---|---|---|---|---|---|---|
| ID | ID | Operation Object | Label | Window | Upper Left | Lower Right | Font | Size | Exec. |
| #12 | (none) | (none) | (none) | (none) | (none) | (none) | (none) | (none) | (none) |

FIG.32

| $13 | | | | | | | | | |
|---|---|---|---|---|---|---|---|---|---|
| ID | ID | Operation Object | Label | Window | Upper Left | Lower Right | Font | Size | Exec. |
| #13 | (none) | (none) | (none) | (none) | (none) | (none) | (none) | (none) | (none) |

FIG.33

| $14 | | | | | | | | | |
|---|---|---|---|---|---|---|---|---|---|
| ID | ID | Operation Object | Label | Window | Upper Left | Lower Right | Font | Size | Exec. |
| #14 | (none) | (none) | (none) | (none) | (none) | (none) | (none) | (none) | (none) |

FIG.34

| $15 | | | | | | | | | |
|---|---|---|---|---|---|---|---|---|---|
| ID | ID | Operation Object | Label | Window | Upper Left | Lower Right | Font | Size | Exec. |
| #15 | (none) | (none) | (none) | (none) | (none) | (none) | (none) | (none) | (none) |

FIG.35

| $2 | | | | | | | | | |
|---|---|---|---|---|---|---|---|---|---|
| ID | ID | Operation Object | Label | Window | Upper Left | Lower Right | Font | Size | Exec. |
| #2 | #16 | SubMenu | Size | Sample | (99, 94) | (181, 117) | Gothic | 12 | done |
|  | #17 | SubMenu | Direction | Sample | (99, 118) | (181, 141) | Gothic | 12 | done |

FIG.36

| $16 | | | | | | | | | |
|---|---|---|---|---|---|---|---|---|---|
| ID | ID | Operation Object | Label | Window | Upper Left | Lower Right | Font | Size | Exec. |
| #16 | #18 | Option Button | A4 | Page Size | (135, 179) | (149, 193) | Gothic | 12 | done |
| | #19 | Option Button | A5 | Page Size | (135, 204) | (149, 218) | Gothic | 12 | done |
| | #20 | Option Button | B4 | Page Size | (232, 179) | (246, 293) | Gothic | 12 | done |
| | #21 | Option Button | B5 | Page Size | (232, 204) | (246, 218) | Gothic | 12 | done |
| | #22 | Push Button | OK | Page Size | (134, 243) | (218, 267) | Gothic | 12 | done |
| | #23 | Push Button | Cancel | Page Size | (232, 243) | (316, 267) | Gothic | 12 | done |

FIG.37

| $18 | | | | | | | | | |
|---|---|---|---|---|---|---|---|---|---|
| ID | ID | Operation Object | Label | Window | Upper Left | Lower Right | Font | Size | Exec. |
| #18 | (none) | (none) | (none) | (none) | (none) | (none) | (none) | (none) | (none) |

FIG.38

| $19 | | | | | | | | | |
|---|---|---|---|---|---|---|---|---|---|
| ID | ID | Operation Object | Label | Window | Upper Left | Lower Right | Font | Size | Exec. |
| #19 | (none) | (none) | (none) | (none) | (none) | (none) | (none) | (none) | (none) |

FIG.39

| $20 | | | | | | | | | |
|---|---|---|---|---|---|---|---|---|---|
| ID | ID | Operation Object | Label | Window | Upper Left | Lower Right | Font | Size | Exec. |
| #20 | (none) | (none) | (none) | (none) | (none) | (none) | (none) | (none) | (none) |

FIG.40

| $21 | | | | | | | | | |
|---|---|---|---|---|---|---|---|---|---|
| ID | ID | Operation Object | Label | Window | Upper Left | Lower Right | Font | Size | Exec. |
| #21 | (none) | (none) | (none) | (none) | (none) | (none) | (none) | (none) | (none) |

FIG.41

| $22 | | | | | | | | | |
|---|---|---|---|---|---|---|---|---|---|
| ID | ID | Operation Object | Label | Window | Upper Left | Lower Right | Font | Size | Exec. |
| #22 | (none) | (none) | (none) | (none) | (none) | (none) | (none) | (none) | (none) |

FIG.42

| $23 | | | | | | | | | |
|---|---|---|---|---|---|---|---|---|---|
| ID | ID | Operation Object | Label | Window | Upper Left | Lower Right | Font | Size | Exec. |
| #23 | (none) | (none) | (none) | (none) | (none) | (none) | (none) | (none) | (none) |

FIG.43

| $17 | | | | | | | | | |
|---|---|---|---|---|---|---|---|---|---|
| ID | ID | Operation Object | Label | Window | Upper Left | Lower Right | Font | Size | Exec. |
| #17 | #24 | Option Button | Vertical | Page Direction | (135, 179) | (149, 193) | Gothic | 12 | done |
|  | #25 | Option Button | Horizontal | Page Direction | (135, 204) | (149, 218) | Gothic | 12 | done |
|  | #26 | Push Button | OK | Page Direction | (134, 243) | (218, 267) | Ming | 10 | done |
|  | #27 | Push Button | Cancel | Page Direction | (232, 243) | (316, 267) | Ming | 10 | done |

FIG.44

| $24 | | | | | | | | | |
|---|---|---|---|---|---|---|---|---|---|
| ID | ID | Operation Object | Label | Window | Upper Left | Lower Right | Font | Size | Exec. |
| #24 | (none) | (none) | (none) | (none) | (none) | (none) | (none) | (none) | (none) |

FIG.45

| $25 | | | | | | | | | |
|---|---|---|---|---|---|---|---|---|---|
| ID | ID | Operation Object | Label | Window | Upper Left | Lower Right | Font | Size | Exec. |
| #25 | (none) | (none) | (none) | (none) | (none) | (none) | (none) | (none) | (none) |

FIG.46

| $26 | | | | | | | | | |
|---|---|---|---|---|---|---|---|---|---|
| ID | ID | Operation Object | Label | Window | Upper Left | Lower Right | Font | Size | Exec. |
| #26 | (none) | (none) | (none) | (none) | (none) | (none) | (none) | (none) | (none) |

FIG.47

| $27 | | | | | | | | | |
|---|---|---|---|---|---|---|---|---|---|
| ID | ID | Operation Object | Label | Window | Upper Left | Lower Right | Font | Size | Exec. |
| #27 | (none) | (none) | (none) | (none) | (none) | (none) | (none) | (none) | (none) |

FIG.48

| Menu | | | | | | |
|---|---|---|---|---|---|---|
| Font | Size | ID | Label | Window | Upper Left | Lower Right |
| Gothic | 12 | # 1 | Letter | Sample | (36,60) | (84,96) |
| | | # 2 | Page | Sample | (85,60) | (157,96) |

FIG.50

| SubMenu | | | | | | |
|---|---|---|---|---|---|---|
| Font | Size | ID | Label | Window | Upper Left | Lower Right |
| Gothic | 12 | # 3 | Font | Sample | (50,94) | (145,117) |
| | | # 4 | Size | Sample | (50,118) | (145,141) |
| | | # 16 | Size | Sample | (99,94) | (118,117) |
| | | # 17 | Direction | Sample | (99,118) | (181,141) |

FIG.51

| OptionButton | | | | | | |
|---|---|---|---|---|---|---|
| Font | Size | ID | Label | Window | Upper Left | Lower Right |
| Gothic | 12 | # 5 | Ming | Letter Font | (147,204,) | (161,218) |
| | | # 6 | Gothic | Letter Font | (147,229) | (161,243) |
| | | # 7 | Roman | Letter Font | (292,204) | (316,218) |
| | | # 10 | Sans Serif | Letter Font | (292,229) | (306,243) |
| | | # 11 | 8 Point | Letter Size | (135,179) | (149,193) |
| | | # 12 | 9 Point | Letter Size | (135,204) | (149,218) |
| | | # 15 | 10 Point | Letter Size | (135,229) | (149,243) |
| | | # 18 | A4 | Page Size | (135,179) | (149,193) |
| | | # 19 | A5 | Page Size | (135,204) | (149,218) |
| | | # 20 | B4 | Page Size | (232,179) | (246,293) |
| | | # 23 | B5 | Page Size | (232,204) | (246,218) |
| | | # 24 | Vertical | Page Direction | (135,179) | (149,193) |
| | | # 25 | Horizontal | Page Direction | (135,204) | (149,218) |

FIG.52

| PushButton | | | | | | |
|---|---|---|---|---|---|---|
| Font | Size | ID | Label | Window | Upper Left | Lower Right |
| Gothic | 12 | # 9 | OK | Letter Font | (231,279) | (315,303) |
| | | # 10 | Cancel | Letter Font | (329,279) | (413,303) |
| | | # 14 | OK | Letter Size | (134,267) | (218,291) |
| | | # 15 | Cancel | Letter Size | (232,267) | (316,291) |
| | | # 22 | OK | Page Size | (134,243) | (218,267) |
| | | # 23 | Cancel | Page Size | (232,243) | (316,267) |
| Ming | 10 | # 26 | OK | Page Direction | (134,243) | (218,267) |
| | | # 27 | Cancel | Page Direction | (232,243) | (316,267) |

FIG.53

| ID | Operation Object | Label | Window | Upper Left | Lower Right | Font | Size |
|---|---|---|---|---|---|---|---|
| #3 | SubMenu | Font | Sample | (50, 94) | (145, 117) | Gothic | 12 |

| A :\sample\sample. exe | | | |
|---|---|---|---|
| No. | Operation Object | Label | Window |
| 1 | Menu | Letter | Sample |
| | SubMenu | Font | Sample |
| 2 | Menu | Letter | Sample |
| | SubMenu | Size | Sample |
| 3 | Menu | Page | Sample |
| | SubMenu | Size | Sample |
| 4 | Menu | Page | Sample |
| | SubMenu | Direction | Sample |

FIG.57

AUTOMATIC GUI SYSTEM OPERATION DEVICE AND OPERATION MACRO EXECUTION DEVICE

BACKGROUND OF THE INVENTION

1. Field of the Invention

The present invention relates to a device for automatically operating a GUI (Graphical User Interface) for the purpose of usability evaluation or operational test of a system having a GUI or generation of an operation macro thereof and to an operation macro execution device for executing the operation macro of the system.

2. Description of Related Art

An evaluation method using a check list is disclosed as a method for evaluating an usability of a system operated by a user in the following articles:

Article (1): CHI '90 Conference Proceedings, ISBN-0-201-50932-6, pp. 249–256 (Apr. 1–5, 1990);

Article (2): "Practical Evaluation Method of User Interfaces", ISBN-4-303-72860-8, pp21–27 (1993); and Article (3): The Technical Reports, the Information Processing Society, Vol. 93, No. 80, pp. 17–24 (Sep. 17, 1993)).

In the user interface evaluation method disclosed in either one of these articles, an operator checks on a display screen whether or not check items listed on a check list are satisfied, for example, whether or not an information displayed on the screen can be understood easily, while changing the content of display by operating the system. Thus, the operator can find certain ones of the check items which do not satisfy definitions thereof, so that it is possible to improve the usability of the system by improving design of the user interface for the certain items.

Further, an automatic operation device of a system operated by a user is disclosed in the following articles:

Article (4): Japanese Patent Application laid-open No. H7-253865; and

Article (5): Japanese Patent Application Laid-open No. H6-95780.

In the device for automatically executing a system operation disclosed in the Article (4) or (5), an operator preliminarily registers and stores operation procedures and the registered operation procedures can be automatically executed sequentially without operation of the operator by reading out the procedures sequentially and sending instructions for executing the individual procedures to the system sequentially.

Further, a device for evaluating an usability of a system having the GUI is disclosed in the following article:

Article (6): "Visual & Textual Consistency Checking Tools for Graphical User Interface", Technical report, CAR-TR-828, Human-Computer Interaction Laboratory, Center for Automation Research, University of Maryland (available from http://www.cs.umd.edu:80/projects/hcil/research/tech-report-list.html1#1996 through World Wide Web, May 1996).

In the GUI evaluation device disclosed in the Article (6), data of font and size of label letters on buttons which are one of GUI operation objects are extracted from a source program of a GUI portion of a system and output in a table format. From the table, an evaluator can compare font and size of label letters on the buttons throughout the system and, if letters, the font and size of which are different from others, are used on some buttons, he can know that the consistency of letter is not maintained throughout the system.

Further, a device for testing an operation normality of a system operated by a user is disclosed in the following articles:

Article (7): Japanese Patent Application Laid-open No. H7-84829;

Article (8): Japanese Patent Application Laid-open No. H7-84765;

Article (9): Japanese Patent Application Laid-open No. H6-28209; and

Article (10): Japanese Patent Application Laid-open No. H2-41529.

Further, as means for testing the normality of operation of a system having a GUI, there are software products WinRunner available from Mercury Interactive, USA, SQA Robot available from SQA, USA, SatellitePackage available from Performance Awareness, USA and VisualTest available from Microsoft, USA. GUI test device using these softwares is introduced in the following article:

Article (11): NIKKEI Open System, No. 40, pp. 247–257 (July, 1996).

In a GUI test device which uses the commercially available software product introduced in the article (11), in order to test an operation of a system responsive to an input operation of a user, a script for automating the input operation of the user is described. Alternatively, it is possible to produce the script by recording the input operation. It is possible to detect an abnormal operation of a system by automatically executing the user input operation by using such script and recording a result of system operation. The user interface test device disclosed in the Article (8) or (10) makes possible to test the system operation by producing a script by recording a user input operation, reproducing the input operation by using the thus produced script and automating the input operation, similarly to the GUI test device using the commercially available software product introduced in the Article (11). Further, in order to test a system operation in response to a user input operation, the user interface test device disclosed in the Article (7) describes a script for automating a user input operation, similarly to the GUI test device using the commercially available software product introduced in the Article (11). By reproducing the user input operation using the script to automate the user input operation, it is possible to test the system operation. On the other hand, in the user interface test device disclosed in the Article (9), it is possible to test a system operation by operating the system by not a user but a robot and recording a result of the system operation. In this case, however, it is necessary to produce a program for controlling the robot.

The following articles disclose a device for producing an operation macro of a system to be operated by a user:

Article (12): Japanese Patent Application Laid-open No. H6-348481;

Article (13): Japanese Patent Application Laid-open No. H6-274329;

Article (14): Japanese Patent Application Laid-open No. H5-173741;

Article (15): Japanese Patent Application Laid-open No. H5-35382; and

Article (16): Japanese Patent Application Laid-open No. H1-237833.

In the operation macro producing device disclosed in each of the Articles (12) to (14), a user inputs a series of procedures for a system sequentially and the operation macro is produced by recording the procedures. On the other hand, in the operation macro producing device disclosed in the Article (15) or (16), procedures performed by a user are monitored during a time for which the user uses a system and a series of procedures, the frequency of use of which exceeds predetermined times, are automatically registered as an operation macro. As mentioned, in the operation macro producing device disclosed in each of the Articles (12) to (16), the series of procedures which are utilized by the user frequently can be executed by the operation macro by producing the operation macro from the procedures performed by the user, so that the operation efficiency is improved.

However, in the user interface evaluation method disclosed in any of the Articles (1) to (3), in which it is judged by the evaluator whether or not the content of the display screen of the system follows the check list items, it is necessary for the user to shift the content on the screen of the system by operating the system sequentially. Therefore, when the size of the system becomes large, the number of procedures to be executed in order to comprehensively shift the content of the system screen is increased, which is very troublesome. Further, when the system size and hence the complication of structure of operation procedures become large, the risk that a user forgets execution of some procedures and a comprehensive confirmation of all contents of the display screen of the system becomes impossible is increased correspondingly.

Tn the system operation automatic execution device disclosed in the Article (4) or (5), it is possible to execute the operation of the system not manually but automatically. Therefore, by executing the user interface evaluation method disclosed in any of the Articles (1) to (3) by utilizing such device, a system operation of an evaluator becomes unnecessary. However, in the system operation automatic execution device disclosed in the Article (4) or (5), it is necessary for the user to preliminarily describe and store the procedures of the system operation to be automatically executed. Therefore, when the system size becomes large, the number of procedures to be executed to comprehensively shift the content of the system screen and, in order to preliminarily describe the operation procedures, enormous labor and time are necessary. Further, the risk that the user forgets to describe a portion of the procedures is increased correspondingly to the increase of the system size and hence the structure of operation procedures and the comprehensive shift of the contents of the display screen of the system becomes impossible.

Further, in the GUI evaluation device disclosed in the Article (6), in order to obtain data of font and size of the label letters on the buttons, a source program of a GUI portion of the system is necessary. Therefore, in a case where only the execution program of the system can be utilized, it is impossible to use the GUI evaluation device disclosed in the Article (6).

In the user interface test device disclosed in any of the Articles (7), (8) and (10) and the GUI test device disclosed in the Article (11) and commercially available as the software product, the script for automating the user input operation is necessary and the tester must produce the script by recording the input procedures of the user or through manually description. Therefore, the larger the system size provides the larger the size of script necessary for testing the system operation comprehensively and thus, in order to preliminarily record or describe the operation procedures, enormous labor and time are necessary. Further, the risk that the user forgets to describe a portion of the procedures is increased correspondingly to the increase of the system size and hence the structure of operation procedures and the comprehensive shift of the contents of the display screen of the system becomes impossible. Further, in the user interface test device disclosed in the Article (9), it is necessary to produce an operation control program for controlling the operation of the robot for operating the system. Therefore, when the size of the system becomes large, the size of the robot operation control program necessary to comprehensively test the system operation becomes enormous and the production of such program requires considerable time and labor. Further, when the system size becomes large and hence the complication of structure of operation procedures is increased, the risk that a user forgets to describe a program portion for operating some procedures is high and it becomes impossible to comprehensively test the system operation.

Further, in the operation macro producing device disclosed in any of the Articles (12) to (16), in order to produce the operation macro, the user must operate the system. Therefore, it is impossible to produce the operation macro before the user operates the system and to supply the operation macro to the user.

SUMMARY OF THE INVENTION

An object of the present invention is to provide an automatic GUI system operation device which is capable of automatically executing a system without the necessity of preliminary description of and storage of procedures of a system operation by a user.

Another object of the present invention is to provide an automatic GUI system operation device having a GUI evaluating function which does not require any manual input operation of an evaluator and which is capable of comprehensively confirming a content on a display screen of a system regardless of a size of the system and is capable of evaluating the usability of the system. The automatic GUI system operation device having the GUI evaluating function will be referred to as "automatic GUI system operation device with GUI evaluation function", hereinafter.

Another object of the present invention is to provide an automatic GUI system operationdevice with GUI evaluation function, which does not require a source program of a GUI portion of a system and is capable of evaluating a consistency of operation objects of the whole system by using only execution programs of the system.

A further object of the present invention is to provide an automatic GUI system operation device having a GUI test function, which does not require any manual script record or description of a tester and is capable of comprehensively testing an operation of the system regardless of a size of the system. The automatic GUI system operation device having a GUI test function will be referred to as "automatic GUI system operation device with GUI test function", hereinafter.

A still further object of the present invention is to provide an automatic GUI system operation device having an operation macro producing function, which does not require any manual operation of a system by a user and is capable of producing an operation macro before the user operates the system. The automatic GUI system operation device having the operation macro generating function will be referred to as "automatic GUI system operation device with operation macro generating function", hereinafter.

Another object of the present invention is to provide an operation macro executing device capable of providing the operation macro to a user.

In order to enable an automatic execution of a system without necessity of preliminarily describing and storing procedures of a system operation by a user, the automatic GUI system operation device according to the present invention which is connected to a program execution unit for controlling an execution of an execution program of a system having a GUI and an operation object detection unit for detecting operation objects of the system which are displayed on a display screen by the program execution unit to automatically operate the system, comprises:

a program execution start unit for causing the program execution unit to start an execution of the execution program of the system;

a screen image recording unit for recording an image on a display screen which is displayed by the program execution unit;

an operation object table recording unit for producing an operation object table from data of operation objects detected by the operation object detection unit and recording the operation object;

a object table stack managing unit for adding identifiers to a table stack of identifiers of the tables of operation objects or deleting identifiers from the table stack of identifiers of the tables of operation objects;

an operation object selection unit for selecting data of the operation objects from the tables of operation objects recorded in the operation object recording unit;

an operation event generation unit for generating an event for executing an operation on operation objects of the system; and a program execution end unit for ending the execution of the execution program of the system which is being executed by the program execution unit, wherein the operation object table recording unit extracts data which is not recorded in the operation object table recording unit from the data of the operation objects detected by the operation object detection unit, produces the operation object table by using the data and records the table, instructs the table stack managing unit to add identifiers of the newly recorded operation object table to the table stack, and, in a case where all of the data of the operation objects detected by the operation object detection unit have been recorded in the operation object table recording unit already, instructs the program execution unit to terminate the execution of the execution program of the system by means of the program execution unit and, in a case where, in the data of the operation objects detected by the operation object detection unit, there are data which are not recorded in the operation object table recording unit as yet, instructs the operation object selection unit to select data of operation objects from the tables of operation objects recorded in the operation object table recording unit, wherein the operation object selection unit searches the tables of operation objects having the top identifier in the table stack from the operation object table recording unit, searches data of operation objects which are not operated as yet from the searched operation object table and instructs the table stack managing unit to select one of data of operation objects which are not operated as yet, if any, or to select one of data of operation objects from the tables of operation objects recorded in the operation object table recording unit if there is no such data, or to delete the identifier in the top of the table stack until all identifiers in the table stack are deleted and then repeats the search processing of the data of the non-operated operation objects, wherein the operation event generator unit generates an event for executing an operation of operation objects of the system using the data of operation objects selected by the operation object selection unit and outputs it to the program execution unit, wherein the program execution end unit instructs the program execution start unit to start the execution of the execution program of the system after the execution of the execution program of the system by the program execution unit is ended, wherein the program execution start unit instructs the operation object selection unit to select data of operation object, after it instructs the program execution unit to start the execution of the execution program in response to the instruction from the program execution end unit, and wherein, when one of data of non operated operation objects is selected in response to the instruction from the program execution start unit instructing the selection of data of operation object, the operation object selection unit searches, from the operation object table recorded in the operation object table recording unit, data of operation object to be executed in order to shift a content on the display screen from an initial content of the system till a content displaying the selected data of operation object.

The tables of operation objects to be recorded in the operation object table recording unit is determined correspondingly to a purpose of use of the automatic GUI system operation device. For example, in a case where an usability of system is evaluated by comprehensively confirming a content on a display screen of a system, it is enough for the tables to include at least identifiers of tables of operation objects, identifiers of the operation objects and coordinates of a display area of the screen on which the operation objects are displayed. On the other hand, in a case where a consistency of operation objects throughout the system is to be evaluated, it is enough for the tables to include at least identifiers of the tables of operation objects, identifiers of operation objects, names of the operation objects, labels of the operation objects, coordinates of a display area of the screen on which the operation objects are displayed, fonts of label letters of the operation objects, sizes of the label letters of the operation objects and labels of windows on which the operation objects are located. Further, when the GUI test is to be performed or the operation macro is to be generated, it is enough for the tables to include at least identfiers of the tables of operation objects, identifiers of operation objects, names of the operation objects, coordinates of a display area of the screen on which the operation objects are displayed, fonts of label letters of the operation objects and labels of windows on which the operation objects are located.

In the automatic GUI system operation device having such construction, the program execution start unit instructs the program execution unit to start an execution of the execution program of the system at a start of the automatic operation of the system and, when the operation objects (such as menu and buttons) is displayed on the display screen by the execution of the execution program, the operation object detection unit detects these operation objects and the operation object table recording unit extracts, from data of the operation objects detected by the operation object detection unit, data of operation objects which are not recorded, produces the tables of operation objects by using the extracted data and records the tables and then instructs the operation object selection unit to select the operation object and the table stack managing unit manages the identifiers of the operation object table recorded by the operation object table recording unit. Then, the operation object selection unit selects data of operation objects to be operated next in order to shift the content of the display screen of the system from the operation object table recorded in the operation object table recording unit by referring to the identifiers of the operation object table managed by the table stack and the operation event generator unit generates an event for executing the operation of the operation object of the system by using the data of the operation objects selected by the operation object selection unit and outputs it to the program execution unit. Thus, the system operates to shift the content of the display screen of the system to a next state as if the user operates the operation objects. By repeating the same procedures as those described in the shifted state, the detection of new operation object, production and recording of the tables of operation objects, selection of data of operation object to be operated secondly in order to further shift the content of the display screen of the system and operation of the operation object are executed and the content is shifted to a next state. The content of the display screen of the system is automatically shifted sequentially in this manner and, if all of the data of the operation objects detected by the operation object detection unit are recorded in the operation object recording unit, the program execution end unit instructs the program execution unit to stop the execution of the system execution program. In order to further operate the operation objects which are not operated as yet, the program execution start unit instructs the operation object selection unit to select data of the operation objects after the program execution unit starts the execution of the system program according to the instruction of the program execution start unit. Thus, the selection of the remaining operation objects which are not selected in the preceding stage is performed, so that the content of the display screen of the system is comprehensively shifted sequentially.

In order to make the content of the display screen of the system possible to be comprehensively confirmed, the automatic GUI system operation device with GUI evaluation function comprises, in addition to the construction of the automatic GUI system operation device mentioned above, display screen image recording unit for recording an image of the display screen displayed by the program execution unit. The display screen image recording unit records an initial image on the display screen of the execution program of the system after the execution of the system execution program is started first by the program execution start unit and, after the operation of the execution program executed by the operation event is completed, records the image of the screen of the system execution program by the operation event every time when the program execution unit receives the operation event from the operation event generator unit. In the automatic GUI system operation device with GUI evaluation function having such construction, the screen image recording unit records an image displayed on the screen by the program execution unit during the system is operated automatically by the automatic GUI system operation device. It becomes possible to comprehensively confirm the system screen without necessity of operating a manual operation of the user and regardless of the size of the system by comprehensively shifting the screen image of the system and automatically recording and outputting the respective screen images in this manner.

In another aspect of the present invention, the automatic GUI system operation device with GUI evaluation function comprises, in order to enable to evaluate the consistency of the operation object, an operation object comparison unit for comparing data of operation objects with each other in the tables of operation objects recorded in the operation object table recording unit, in addition to the construction of the automatic GUI system operation device.

In order to enable to evaluate the consistency of operation object, the operation object comparison unit of the automatic GUI system operation device with GUI evaluation function compares the data of operation objects with each other recorded in the operation object table recording unit by the automatic operation of the system by means of the automatic GUI system operation device. Since it is possible to automatically and comprehensively record the data of the system operation object to be evaluated by using only the system execution program in this manner, it is possible to evaluate the consistency of the operation object throughout the system by using only the system execution program, without necessity of the source program of the GUI portion of the system.

In another aspect of the present invention, the automatic GUI system operation device with GUI evaluation function comprises an operation error recording unit for detecting and recording operation error when such operation error occurs in the execution program which is being executed by the program execution unit and an input operation is rejected. When the operation error recording unit detects the operation error, it acquires data of an operation object executed immediately before the occurrence of the operation error from the operation object selection unit, records the data of the operation object as an operation error information and instructs the program execution end unit to terminate the execution of the system execution program which is being executed by the program execution unit.

In such automatic GUI system operation device with GUI evaluation function, the operation error recording unit detects the operation error when such operation error occurs in the execution program which is being executed by the program execution unit and an input operation is rejected and records the operation error information. Since the operation error information is recorded by automatically and comprehensively executing the operation of the system to be tested by using only the execution program of the system, the tester is required to neither record nor describe a script for automatically operating the system. That is, it is possible to comprehensively test the system operation without necessity of tester's procedures for recording or describing the script and regardless of the system size.

In another aspect of the present invention, the automatic GUI system operation device with operation macro generating function comprises an operation macro recording unit for generating an operation macro on the basis of the tables of operation objects recorded in the operation object table recording unit and recording the operation macro in addition to the construction of the automatic GUI system operation device. The operation macro recording unit records a sequence of procedures for executing an operation of the operation object in a predetermined layer by using the data of the operation objects in the tables of operation objects recorded in the operation object table recording unit as the operation macro.

In such automatic GUI system operation device with operation macro generating function, the operation macro recording unit generates the operation macro on the basis of the operation object table obtained by the automatic operation of the system by the automatic GUI system operation device and recorded in the operation object table recording unit. That is, the operation macro is automatically generated on the basis of the data of the operation objects obtained by automatically and comprehensively executing the operation of the objective system and recording data of the operation objects of the objective system automatically and comprehensively.

The operation macro execution device for executing an operation macro of a system having GUI, according to the present invention, connected to a program execution unit for executing an execution program of a system and an operation object detection unit for detecting operation object of the system which is displayed on a display screen by the program execution unit, comprises:

a program macro recording unit for recording the operation macro; and an operation event unit for generating an event for executing an operation of the operation objects of the system, wherein data of operation object output from the operation object detection unit includes at least name of the operation object, label of the operation object, coordinates of a display area of the operation object and a label of a window on which the operation object is located, wherein the operation event generator unit refers the operation macro recorded in the operation macro recording unit, extracts data of operation object for executing the operation macro selected on the display screen by a user from the data of operation object detected by the operation object detection unit, generates an event for executing an operation of operation objects having the extracted data and outputs the event to the program execution unit.

In such operation macro execution device, the execution of the operation macro becomes possible by displaying the operation macro stored in the operation macro recording unit on the display screen by operation macro display unit and generating the event to which the operation of the operation object of the system by an operation event generator unit when the user selects the operation macro on the display screen. In a case where the operation macro generated by the automatic GUI system operation device with operation macro generating function, when the user selects the operation macro, the selected operation macro is automatically executed. Therefore, it becomes possible to generate the operation macro before the user operates the system and provide the operation macro to the user.

BRIEF DESCRIPTION OF THE DRAWINGS

The above and other objects, features and advantages of the present invention will become more apparent when reading the following detailed description of the invention with reference to the drawings, in which:

FIG. 5 shows an example of a table of operation object generated and recorded in an operation object table recording unit;

FIG. 6 shows an example of a content of a table stack managed by a table stack managing unit;

FIG. 7 shows an example of the operation object table of in which the Execution data of a selected object is changed to "done";

FIG. 8 shows an example of kinds of operation objects and operation events corresponding thereto;

FIG. 15 shows an example of the table of operation object generated and recorded in the operation object table recording unit;

FIG. 16 shows an example of a content of the table stack managed by the table stack managing unit;

FIG. 17 shows an example of the table of operation object generated and recorded by the operation object table recording unit;

FIG. 18 shows an example of a content of the table stack managed by the table stack managing unit;

FIG. 19 shows an example of the table of operation object generated and recorded in the operation object table recording unit;

FIG. 20 shows an example of the table of operation object generated and recorded in the operation object table recording unit;

FIG. 21 shows an example of the table of operation object generated and recorded in the operation object table recording unit, FIG. 22 shows an example of the table of operation object generated and recorded in the operation object table recording unit;

FIG. 23 shows an example of the table of operation object generated and recorded in the operation object table recording unit;

FIG. 24 shows an example of the table of operation object generated and recorded in the operation object table recording unit;

FIG. 25 shows an example of the table of operation object generated and recorded in the operation object table recording unit;

FIG. 26 shows an example of the table of operation object generated and recorded in the operation object table recording unit;

FIG. 27 shows an example of the table of operation object generated and recorded in the operation object table recording unit;

FIG. 28 shows an example of the table of operation object generated and recorded in the operation object table recording unit;

FIG. 29 shows an example of the table of operation object generated and recorded in the operation object table recording unit;

FIG. 30 shows an example of the table of operation object generated and recorded in the operation object table recording unit;

FIG. 31 shows an example of the table of operation object generated and recorded in the operation object table recording unit;

FIG. 32 shows an example of the table of operation object generated and recorded in the operation object table recording unit;

FIG. 33 shows an example of the table of operation object generated and recorded in the operation object table recording unit;

FIG. 34 shows an example of the table of operation object generated and recorded in the operation object table recording unit;

FIG. 35 shows an example of the table of operation object generated and recorded in the operation object table recording unit;

FIG. 36 shows an example of the table of operation object generated and recorded in the operation object table recording unit;

FIG. 37 shows an example of the table of operation object generated and recorded in the operation object table recording unit;

FIG. 38 shows an example of the table of operation object generated and recorded in the operation object table recording unit;

FIG. 39 shows an example of the table of operation object generated and recorded in the operation object table recording unit;

FIG. 40 shows an example of the table of operation object generated and recorded in the operation object table recording unit;

FIG. 41 shows an example of the table of operation object generated and recorded in the operation object table recording unit;

FIG. 42 shows an example of the table of operation object generated and recorded in the operation object table recording unit;

FIG. 43 shows an example of the table of operation object generated and recorded in the operation object table recording unit;

FIG. 44 shows an example of the table of operation object generated and recorded in the operation object table recording unit;

FIG. 45 shows an example of the table of operation object generated and recorded in the operation object table recording unit;

FIG. 46 shows an example of the table of operation object generated and recorded in the operation object table recording unit;

FIG. 47 shows an example of the table of operation object generated and recorded in the operation object table recording unit;

FIG. 48 shows an example of the table of operation object generated and recorded in the operation object table recording unit;

FIG. 50 shows an example of an output of an operation object comparison unit;

FIG. 51 shows an example of an output of an operation object comparison unit;

FIG. 52 shows an example of an output of an operation object comparison unit;

FIG. 53 shows an example of an output of an operation object comparison unit;

FIG. 57 shows an example of a macro operation generated and recorded by an operation macro recording unit;

DETAILED DESCRIPTION OF PREFERRED EMBODIMENTS

Figure 1:
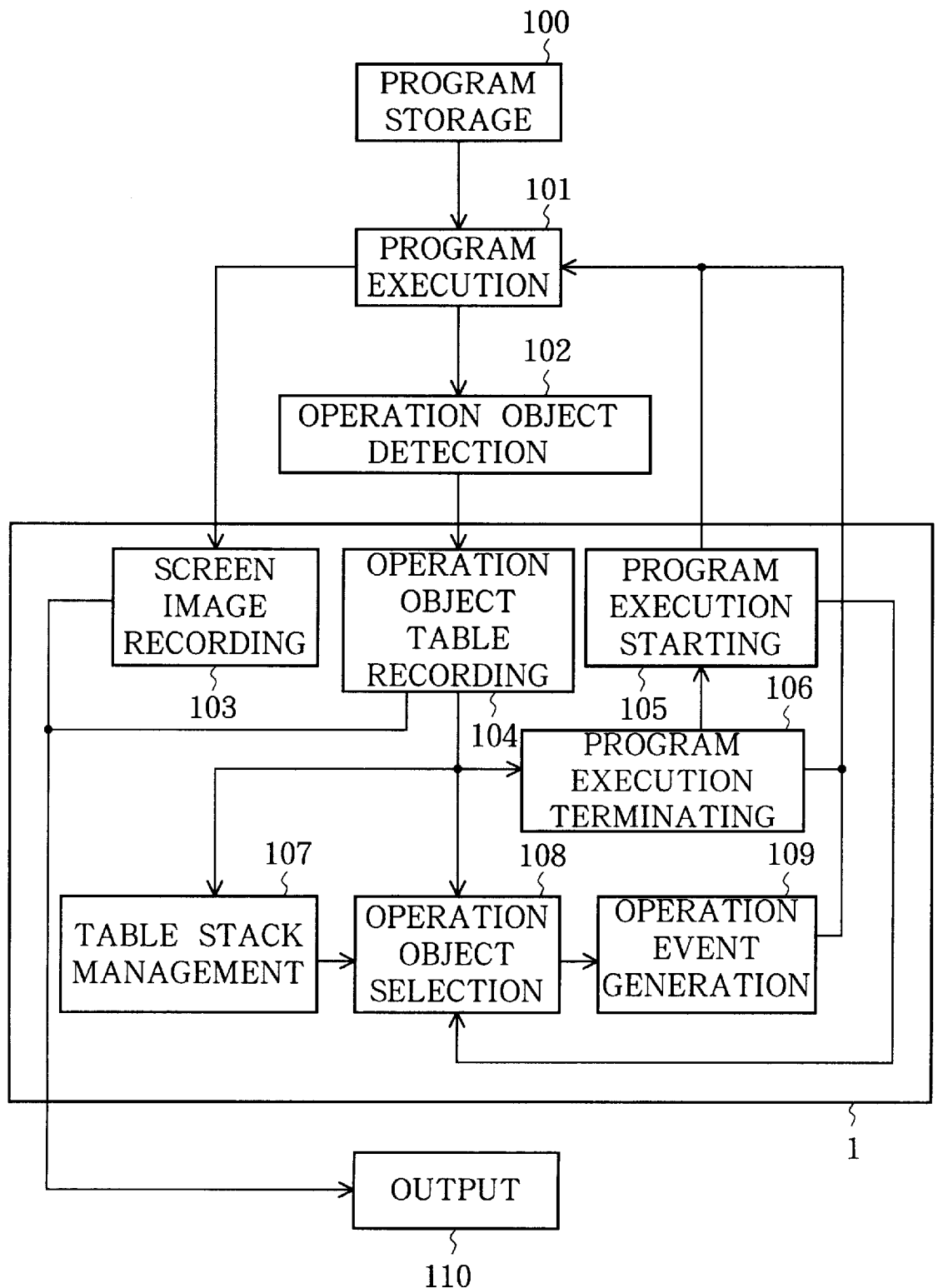
FIG. 1 shows a construction of a first embodiment of an automatic GUI system operation device according to the present invention.

A construction of an embodiment of an automatic GUI system operation device according to the present invention is shown in FIG. 1. In this embodiment, the GUI evaluation is made possible by performing an automatic operation of a GUI system and recording a display image on a display screen during the automatic operation.

In FIG. 1, the automatic GUI system operation device 1 comprises a screen image recording unit 103, an operation object table recording unit 104, a program execution start unit 105, a program execution end unit 106, a table stack managing unit 107, an operation object selection unit 108 and an operation event generator unit 109 and is connected to a program execution unit 101, an operation object detection unit 102 and an output unit 110. An execution program of a GUI system to be evaluated is stored in a program storage unit 100.

In this embodiment, the program storage unit 100 is an external memory unit such as a hard disc connected to a personal computer (referred to as "PC", hereinafter) or a work station (referred to as "WS", hereinafter). The program execution unit 101 is an operating system for controlling an execution of the execution program on PC's and/or WS's and the program execution unit 101 itself is an execution program operating on the PC's and/or WS's. The operation object detection unit 102, the program execution start unit 105, the program execution end unit 106, the operation object selection unit 108 and the operation event generator unit 109 are realized by, for example, execution programs operating in PC's and/or WS's. The screen image recording unit 103 is realized by an execution program operating in PC's and/or WS's and an external memory exemplified by such as a hard disk connected to PC's and/or WS's. That is, the execution program of the screen image recording unit 103 executes a write of data to be recorded or managed in the external memory, a read of the data from the external memory and a rewrite of the data to the external memory. The output unit 110 is such as a printer or display device connected to PC's and/or WS's.

Figures 2, 3, 4:
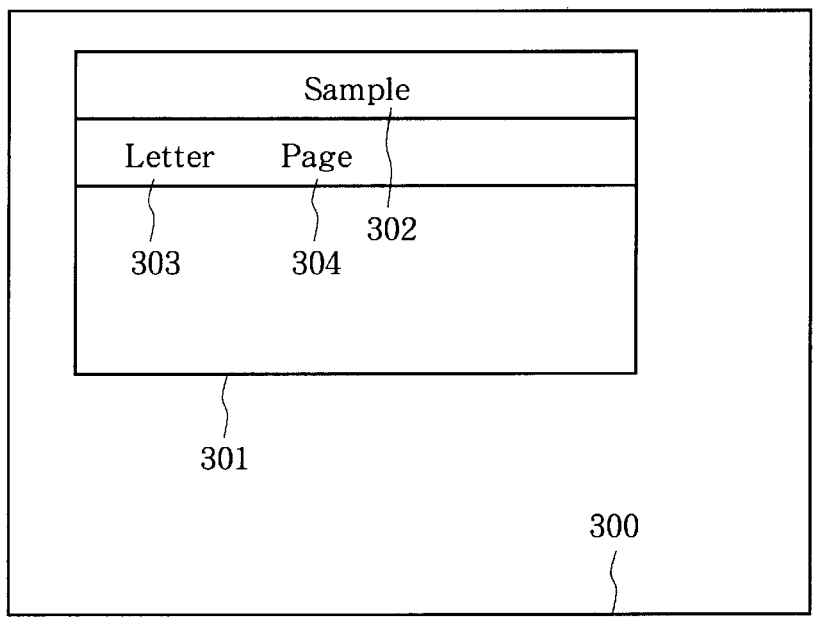
FIG. 2 shows an example of an execution program name registered in a program execution start unit shown in FIG. 1.
FIG. 3 shows an example of an image of the execution program displayed on a display screen.
FIG. 4 shows an example of an operation object data detected and output by an operation object detection unit.

Names of the execution programs of the GUI system to be evaluated are preliminarily stored in the program execution start unit 105. FIG. 2 shows an example of the name of registered execution program. The program execution start unit 105 instructs the program execution unit 101 to read the registered execution program from the program storage unit 100 to thereby start an operation.

The screen image recording unit 103 acquires an image of the program on a display screen when the program is started and records the acquired image. FIG. 3 shows an example of the screen image after the program is started. In FIG. 3, an area surrounded by a frame 300 is a whole screen area. A reference numeral 301 indicates a program window and a line of letters "Sample" 302 is a window title. Further, reference numerals 303 and 304 indicate "Letter" and "Page", respectively, which are in a menu. The screen image recording unit 103 acquires the screen image shown in FIG. 3 from the program execution unit 101, assigns an initial value (#0) of an identifier to the screen and records the screen image together with the identifier.

The operation object detection unit 102 detects an operation object displayed on the screen from the program execution unit 101. In this embodiment, the operation objects detected by the operation object detection unit 102 are four kinds, menu (Menu), sub-menu (SubMenu), option button (OptionButton) and push button (PushButton). For example, in a case where the operation objects are detected on the program display screen shown in FIG. 3, the operation object detection unit 102 outputs an operation object data shown in FIG. 4. In FIG. 4, two menus are detected as the operation objects displayed on the display screen, which are on the window "Sample" and their part labels are "Letter" and "Page". Further, coordinates of positions thereof on the display screen (in this embodiment, each operation object has a rectangular operation area and a position of the operation object on the display screen is indicated by an upper left point and a lower right point of the rectangular area), font of letter of the part label and letter size (letter size is indicated by using "point" unit) are also recorded.

The operation object table recording unit 104 records data of newly detected operation object (not recorded in any operation object table as yet) as an operation object table on the basis of the operation object data output from the operation object detection unit 102. Further, the operation object table recording unit 104 instructs the table stack managing unit 107 to add identifiers of the recorded table to the table stack.

As an example, when the operation object data shown in FIG. 4 is input, the operation object table recording unit 104 records an operation object table shown in FIG. 5. In FIG. 5, the identifier in this table is $0 and there are 2 new operation objects, that is, "Letter" menu and "Page" menu, on the screen of the identifier #0, to which identifiers #1 and #2 are assigned, respectively. The operation objects in FIG. 5 whose data in "Execution" column are "Not Yet" indicate that an operation of each of the parts is not executed as yet. The operation object table recording unit 104 records one operation object table every time the operation object detection unit 102 performs a part detection.

Therefore, the number of tables of operation objects is equal to the number of times the operation object detection unit 102 performs the part detection. Further, the operation object table recording unit 104 instructs the table stack managing unit 107 to add the identifier ($0) of the operation object table which is just recorded to the table stack. As a result, the table stack which is managed by the table stack managing unit 107 becomes as shown in FIG. 6.

Further, the operation object table recording unit 104 instructs the program execution end unit 106 to end the program running in the program execution unit 101 when there is no new operation object in the operation objects detected by the operation object detection unit 102. When there is a new operation object, the operation object table recording unit 104 instructs the operation object selection unit 108 to select the operation object.

The operation object selection unit 108 searches the tables of operation object having an identifier in the top of the table stack managed by the table stack managing unit 107 from the operation object table recording unit 104 and selects an operation object having an identifier having the smallest number from operation objects whose operation is not executed as yet (operation objects whose data in the "Execution" column is "Not Yet") in the table. Further, the operation object selection unit 108 rewrites the data in the "Execution" column of the selected operation object from "Not Yet" to "Done". For example, in a case where the table stack is as shown in FIG. 6, since the identifier $0 is stored in the top, the operation object table having the identifier $0 is searched. In a case of the operation object table is as shown in FIG. 5, since, among the operation objects having data in the "Execution" column is "Not Yet", the part having the smallest identifier number is the "Letter" menu (identifier #1), the "Letter" menu is selected and the data in the "Execution" column of the "Letter" menu is rewritten to "Done". Then, the table of the identifier $0 becomes the state shown in FIG. 7.

The operation event generator unit 109 generates an event for operating the operation object selected by the operation object selection unit 108, outputs the operation event to the program execution unit 101 to automatically execute the operation. It is assumed that kind of event to be generated is determined correspondingly to kind of operation object as shown in FIG. 8. In the example shown in FIG. 8, all of the events for operating four operation objects (Menu, SubMenu, OptionButton, PushButton) are "Click(x,y)". It should be noted that the operation objects corresponding to the events of "Click(x,y)" are parts which can be operated by a mouse at coordinates (x,y) within the operation areas of the parts.

Figures 9, 10:
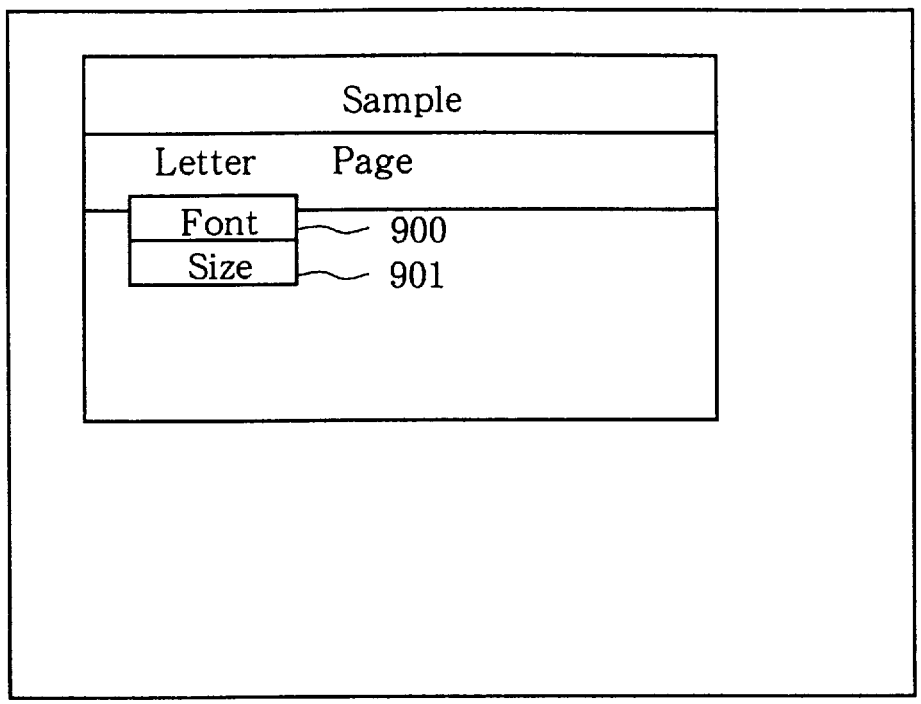
FIG. 9 shows an example of the display of the execution program on the display screen.
FIG. 10 shows an example of an operation object data detected and output by the operation object detection unit.

An operation of the operation event generator unit 109 will be described by taking a case where the operation object selection unit 108 selects from the tables of operation objects shown in FIG. 5 a part having identifier #1 ("Letter" menu) as an example. In this case, since the selected part is Menu, the event to be generated is determined as "Click(x,y)" from FIG. 8. Further, the coordinates to be clicked is determined as (60,78) by calculating an intermediate point between two coordinates (36,60) and (84,96) showing the operation areas of the "Letter" Menu. It should be noted that, in this calculation of the intermediate point, decimal fraction is disregarded. The operation event generator unit 109 generates "Click(x,y)" identical to that generated when a user clicks the coordinate (60,78) by using the mouse and sends it to the program execution unit 101. As a result, the program execution unit 101 executes the processing when the "Letter" menu is operated. FIG. 9 shows an image of the program on the display screen after the processing was executed, which shows that two sub-menu 900 and 901 are displayed on the screen by the operation of the "Letter" menu.

Figures 11, 12:
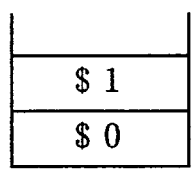
FIG. 11 shows an example of a table of operation object generated and recorded in the operation object table recording unit.
FIG. 12 shows an example of a content of a table stack managed by the table stack managing unit.
Figures 13, 14:
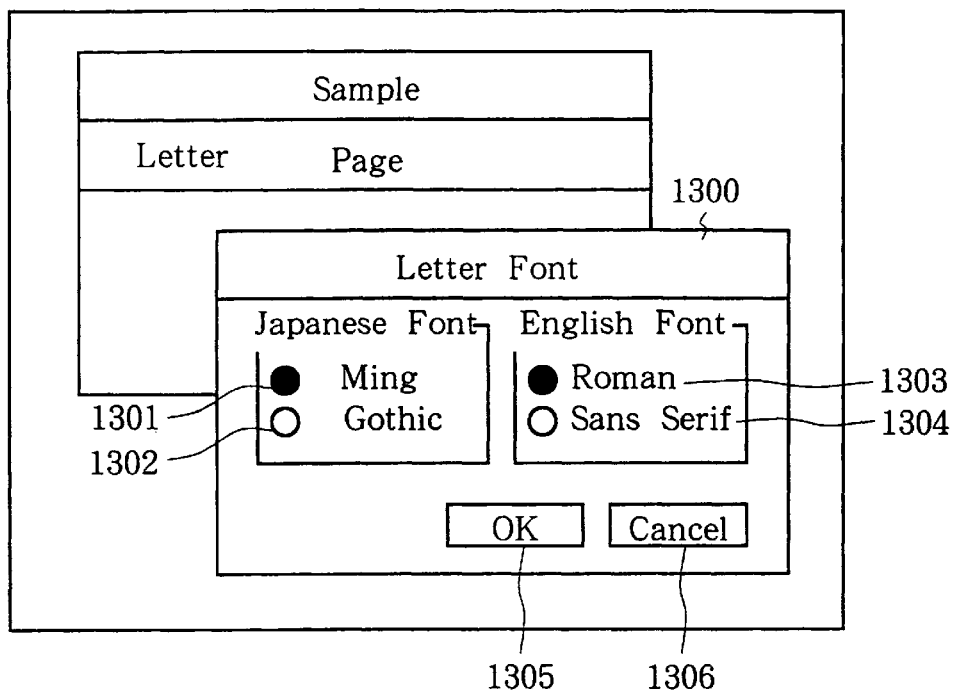
FIG. 13 shows an example of the display of the execution program on the display screen.
FIG. 14 shows an example of the operation object data detected and output by the operation object detection unit.

The above described procedures from the recording of the image on the display screen to the generation of the operation event constitute a basic 1 cycle of the automatic operation of the program. After the image of the program on the display screen becomes the state shown in FIG. 9 by the operation of the "Letter" menu, the screen image recording unit 103 acquires the screen image shown in FIG. 9, assigns the identifier #1 of "Letter" menu to the screen image and records the screen image together with the identifier. Then, the operation object detection unit 102 detects operation objects on the display screen and outputs data of the operation object shown in FIG. 10. Then, the operation object table recording unit 104 records data of new operation objects (FIG. 11) and the table stack managing unit 107 adds the identifier $1 to the table stack (FIG. 12). Then, the operation object table recording unit 104 instructs the operation object selection unit 108 to select a part. Since the table stack is in the state shown in FIG. 12 and the operation object table of the identifier $1 is in the state shown in FIG. 11, the operation object selection unit 108 selects "Font" sub-menu. Further, data of the "Execution" column of the "Font" sub-menu is rewritten from "Not Yet" to "Done". Then, the operation event generator unit 109 determines the kind and coordinates of an event for operating the "Font" sub-menu, generates an event "Click(97,105)" and outputs it to the program execution unit 101. As a result, the program execution unit 101 executes a processing when the "Font" sub-menu is operated. FIG. 13 shows an example of a display of the program on the screen after the execution of the processing, in which a "Letter Font" window 1300 is newly displayed on which window four option buttons 1301 to 1304 and two push buttons 1305 and 1306 are located.

In the next cycle, the screen image shown in FIG. 13 is recorded together with an identifier #3 of the "Font" sub-menu and, by a detection of operation objects, data of the operation objects shown in FIG. 14 is output from the operation object detection unit 102. On the basis of the operation object data output from the operation object detection unit 102, the operation object table shown in FIG. 15 is recorded as data of a new operation object. The state of the table stack becomes as shown in FIG. 16. Then, "Ming" option button (identifier #5) is selected and data of the "Execution" column thereof is rewritten to "Done". Then, an event "Click(154,211)" is generated and sent to the program execution unit 101. As a result, a processing when the "Ming" option button is operated is executed. In this case, the option mark does not move and the display screen image of the program shown in FIG. 13 is sustained.

Now, a processing when any new operation object is not detected will be described. When, succeeding to the above mentioned processing, an operation object is detected in the state shown in FIG. 13, the operation object detection unit 102 outputs the same operation object data as that shown in FIG. 14. Therefore, there is no new operation object which is not recorded in any operation object table recorded by the operation object table recording unit 103. As a result, the operation object table recording unit 104 records the operation object table shown in FIG. 17 and the table stack becomes in the state shown in FIG. 18. Then, the operation object table recording unit 104 sends an instruction to the program execution end unit 106 since there is no new operation object detected. In response to this instruction, the program execution end unit 106 forcibly stops the program to be evaluated and running by the program execution unit 101 and instructs the program execution start unit 105 to re-start the program. In response to the instruction from the program execution end unit 106, the program execution start unit 105 instructs the program execution unit 101 to re-start the program to be evaluated as in the case of the initial start thereof. As a result, the program execution unit 101 loads the program to be evaluated from the program storage unit 100 and restarts it.

Then, the program execution start unit 105 instructs the operation object selection unit 108 to select operation objects whose operation is not executed. In more detail, an identifier in the top of the table stack is acquired and an operation object among those having data of the "Execution" columns are "Not Yet", which has the smallest identifier number, is selected from the operation object table including the smallest identifier number. In a case where there is no operation object whose data of the "Execution" column is "Not Yet" in the operation object table , the identifier in the top in the table stack is deleted and an operation object whose data in the "Execution" column is "Not Yet" is searched from the table having an identifier in the next level. In a case where all identifiers are deleted from the table stack and the table stack becomes empty, the automatic operation processing cycle is terminated and the screen image recorded in the screen image recording unit 103 and the operation object table recorded in the operation object table recording unit 104 are output to the output unit 110.

In the above mentioned example of the initialization processing after the operation of the "Ming" option button, after the program is re-started and at the time when the part selection instruction is sent to the operation object selection unit 108, the operation object table recording unit 108 stores four tables of operation objects shown in FIGS. 7, 17, 19 and 20 and the table stack is in the state shown in FIG. 18. Therefore, the identifier $5 is deleted from the table stack, the "Gothic" option button of the identifier #6 is selected from the table (FIG. 20) of the identifier $3 and the data of the "Execution" column of the "Gothic" option button is rewritten to "Done".

Further, when the operation object selection unit 108 receives the part selection instruction from the program execution start unit 105, the unit 108 selects one of the operation objects which are not operated as yet and, thereafter, operation objects to be operated in a time from the initial screen image (in this example, FIG. 3) of the program to the screen image of this operation object are selected from the operation object table recorded in the operation object table recording unit 104 on the basis of the state of the table stack. In more detail, data of identifiers of the first column (leftmost "Identifier" column) in the operation object table having the identifier is searched sequentially from the bottom (starting from the identifier in the second level from the bottom, except the identifier in the bottom) in the table stack. Then, the operation objects having this identifier is searched from the operation object table recorded in the operation object table recording unit 104. By operating the operation objects thus searched in the sequence of the searching, it is possible to arrive at the operation object which is not operated as yet. In the previous example in which the "Gothic" option button is selected as the operation object which is not operated as yet, the table stack is in the state shown in FIG. 16. Therefore, the identifier #1 is detected from the first column of the operation object table (FIG. 19) of the identifier $1 and the "Letter" menu having this identifier is searched. Then, the identifier #3 is detected from the first column of the operation object table (FIG. 20) of the identifier $3 and the "Font" sub-menu having this identifier is searched. Therefore, it is clear that, after the operation event of the "Letter" menu and the operation event of the "Font" sub-menu are generated in the order and the programs are automatically operated, the operation event of the "Gothic" option button is generated.

As described, when there are new parts in the operation objects detected by the operation object detection unit 102, one of them is selected and operated and, when there is no new part, the program is initialized and operation objects which are not executed as yet are selected and executed. This cycle is repeated. When all identifiers are deleted from the table stack and the table stack becomes empty, the automatic operation processing is terminated and the screen image recorded in the screen image recording unit 103 and the operation object table recorded in the operation object table recording unit 104 are output to the output unit 110. As an example, it is assumed that the tables of operation objects recorded in the operation object table recording unit 104 at the time when the automatic operation cycle is terminated are those shown in FIGS. 21 to 48. Further, when the output unit 110 is, for example, a printer, the output unit 110 prints the screen image recorded in the screen image recording unit 105 together with the identifiers and prints the tables of operation objects recorded in the operation object table recording unit 104 and shown in FIGS. 21 to 48.

Therefore, with the automatic GUI system operation device 1 shown in FIG. 1, it is possible to automatically and comprehensively execute the operation of the system to be evaluated, comprehensively shift the screen of the system and automatically record and output the images on the respective screens. Therefore, the evaluator is not required to operate the system. That is, it becomes possible to comprehensively confirm the system screen without necessity of evaluator's input operation regardless of the system size.

Figure 49:
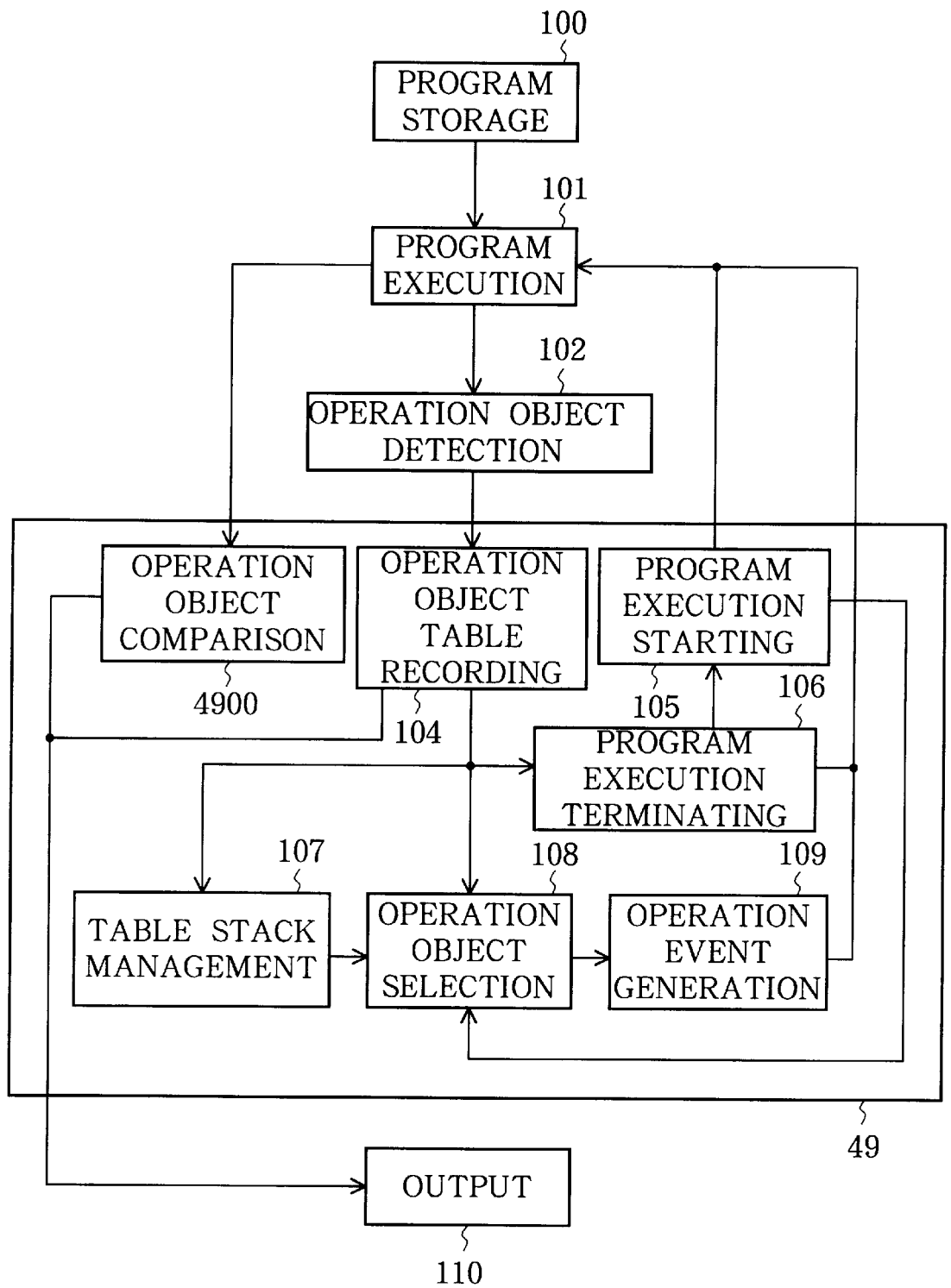
FIG. 49 shows another embodiment of the automatic GUI system operation device according to the present invention.

FIG. 49 shows a construction of another embodiment of the automatic GUI system operation device according to the present invention. In this embodiment, the consistency evaluation of the operation objects is made possible by performing the automatic operation of the GUI system and comparing data of the operation objects during the automatic operation.

In FIG. 49, an automatic GUI system operation device 49 comprises an operation object table recording unit 104, a program execution start unit 105, a program execution end unit 106, a table stack managing unit 107, an operation object selection unit 108, an operation event generator unit 109 and an operation object comparison unit 4900 and is connected to a program execution unit 101, an operation object detection unit 102 and an output unit 110. An execution program of the GUI system to be evaluated is stored in a program storage unit 100. In FIG. 49, the units other than the operation object comparison unit 4900 are the same as those of the embodiment shown in FIG. 1. That is, as in the case of the embodiment shown in FIG. 1, the program is automatically operated to record the tables of operation objects. It is assumed here as an example that the tables of operation objects shown in FIGS. 21 to 48 are recorded in the operation object table recording unit 104. Incidentally, the operation object comparison unit 4900 is realized by, for example, an execution program to be run on PC's and/or WS's.

When an automatic operation cycle is terminated and the operation object comparison unit 4900 receives an instruction from the operation object table recording unit 104, the operation object comparison unit 4900 classifies the operation objects into tables correspondingly to respective kinds of operation objects by using the tables of operation objects recorded in the operation object table recording unit 104. Further, for each kind of operation objects, the operation object comparison unit 4900 compares font and size of labels of the operation objects with each other and puts the operation objects having the same combination of font and size together in one item. For example, in a case where the tables of operation objects recorded in the operation object table recording unit 104 are as shown in FIGS. 21 to 48, the operation object comparison unit 4900 outputs tables shown in FIGS. 50 to 53. From these tables, it is clear that, although the font and size of the operation object labels for Menu, SubMenu, OptionButton are consistent, there are two combinations of font and size for PushButton and there is no consistency throughout the program.

The output unit 110 outputs the tables output by the operation object comparison unit 4900. For example, when the output unit 110 is a printer, the tables output by the operation object comparison unit 4900 are printed.

Therefore, with the automatic GUI system operation device 49, it is possible to automatically and comprehensively record the data of the operation objects of the system to be evaluated by using only the execution program of the system. Therefore, there is no need of a source program of a GUI portion of the system and it is possible to evaluate the consistency of the operation objects throughout the system by using only the execution program of the system.

Figures 54, 55:
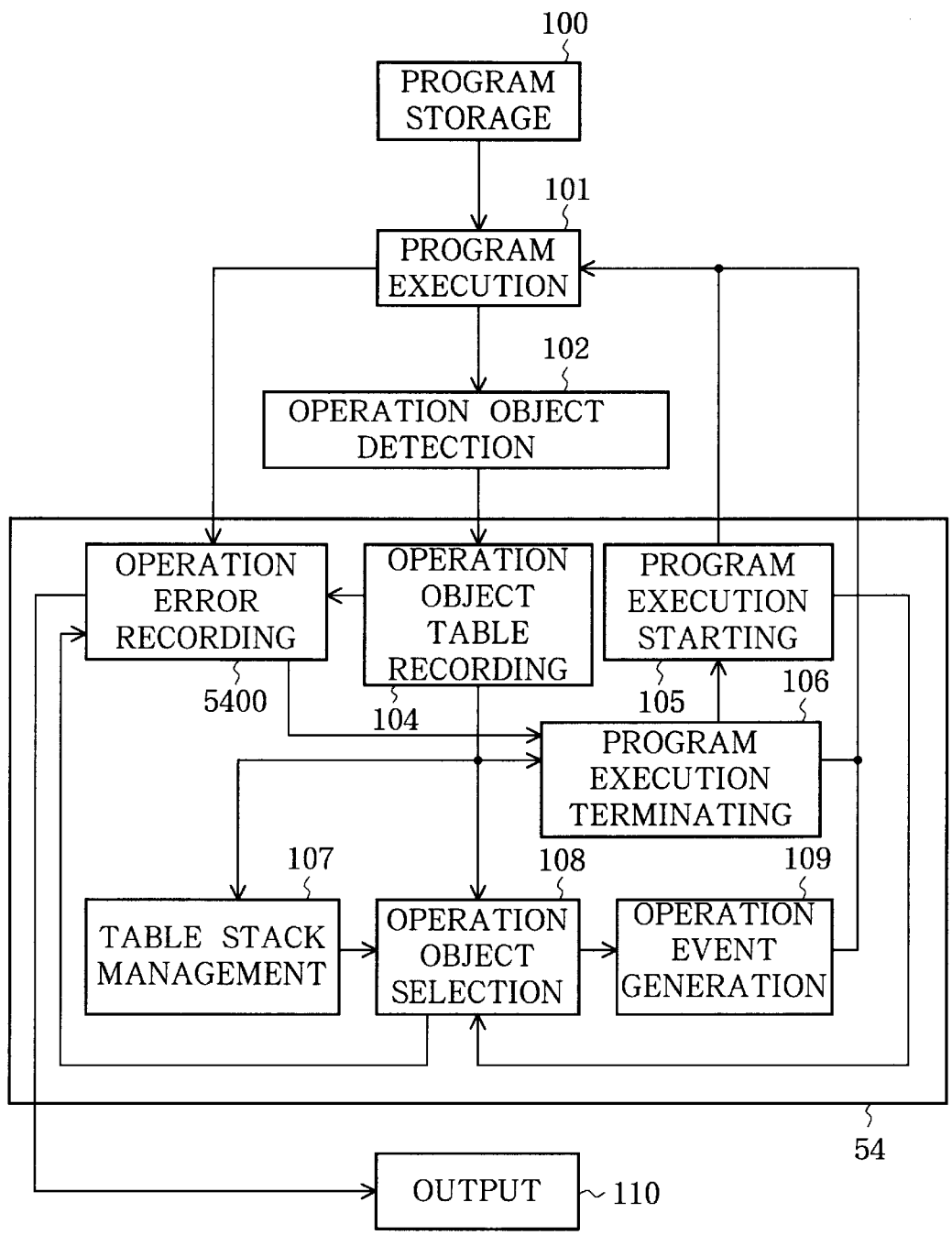
FIG. 54 shows a construction of another embodiment of the automatic GUI system operation device according to the present invention.
FIG. 55 shows an example of an operation error information.

FIG. 54 shows a still another embodiment of an automatic GUI system operation device according to the present invention. In this embodiment, the GUI test is made possible by performing the automatic operation of the GUI system and outputting an operation error when an operation error is detected during the automatic operation.

In FIG. 54, an automatic GUI system operation device 54 comprises an operation object table recording unit 104, a program execution start unit 105, a program execution end unit 106, a table stack managing unit 107, an operation object selection unit 108, an operation event generator unit 109 and an operation error recording unit 5400 and is connected to a program execution unit 101, an operation object detection unit 102 and an output unit 110. An execution program of the GUI system to be tested is stored in a program storage unit 100. In FIG. 54, the units other than the operation error recording unit 5400 are the same as those of the embodiment shown in FIG. 1. That is, as in the case of the embodiment shown in FIG. 1, the program is automatically operated to record the tables of operation objects. Incidentally, the operation error recording unit 5400 is realized by, for example, an execution program to be executed on PC's and/or WS's and an external memory such as hard disk connected to PC's and/or WS's. That is, the execution program records data to the external memory, loads data from the external memory and rewrite data in the the external memory.

When the program which is being executed in the program execution unit 101 becomes abnormal and the input operation is rejected, the operation error recording unit 5400 detects this operation error and acquires data of the operation object which was executed lastly from the operation object selection unit 108 and records it.

As an example, it is assumed that, after the "Font" sub-menu of the program which was used in the description of the embodiment shown in FIG. 1 is automatically operated, the operation of this program becomes abnormal and the input operation is rejected. In this case, when the operation error is detected, the operation error recording unit 5400 records the operation object data (FIG. 55) of the "Font" sub-menu. Further, in order to initialize the program, the operation error recording unit 5400 instructs the program execution end unit 106 to forcibly stop the execution of the program. The flow of the initialization processing is the same as that in the embodiment shown in FIG. 1.

When the automatic operation cycle is terminated, the output unit 110 instructs the operation error recording unit 5400 to output the operation error information (data of the operation object by which the operation error occurs) recorded therein. In a case where the output unit 110 is a printer, it prints the operation error information with the format thereof as it is.

Therefore, with the automatic GUI system operation device 54, it is possible to automatically and comprehensively execute the operation of the system to be tested and record the operation error information of the system. Therefore, the tester is not required to record or describe the script for automatically operating the system. That is, it becomes possible to comprehensively test the operation of the system without requiring the work of the tester for recording or describing the script regardless of the system size.

Figure 56:
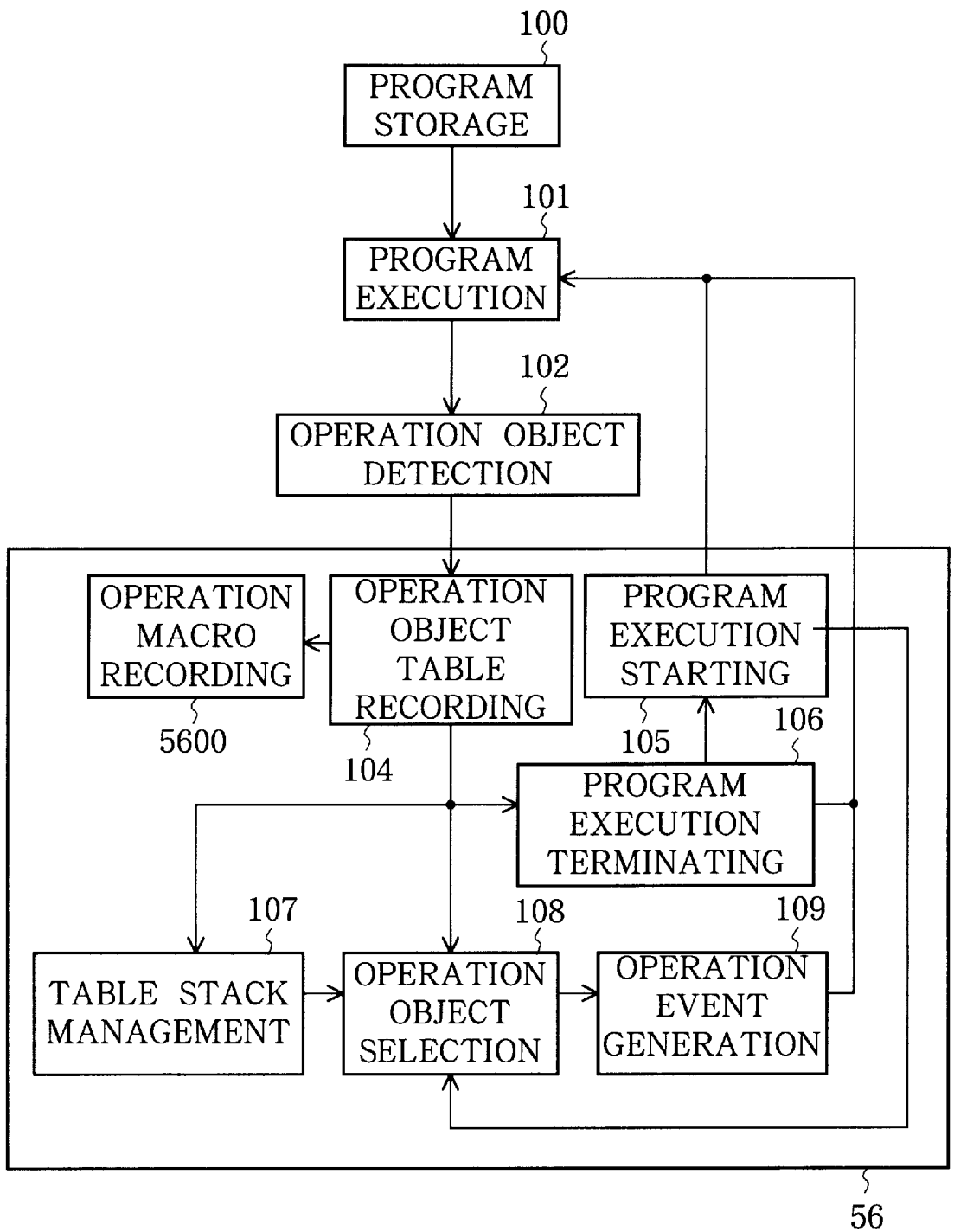
FIG. 56 shows a construction of another embodiment of the automatic GUI system operation device according to the present invention.

FIG. 56 shows a still another embodiment of an automatic GUI system operation device according to the present invention. In this embodiment, an operation macro is generated and recorded from tables of operation objects obtained during an automatic operation of a GUI system.

In FIG. 56, a GUI system operation device 56 comprises an operation object table recording unit 104, a program execution start unit 105, a program execution end unit 106, a table stack managing unit 107, an operation object selection unit 108, an operation event generator unit 109 and an operation macro recording unit 5600 and is connected to a program execution unit 101 and an operation object detection unit 102. An execution program of the GUI system for which the operation macro is to be generated is stored in a program storage unit 100. In FIG. 56, the units other than the operation macro recording unit 5600 are the same as those of the embodiment shown in FIG. 1. That is, as in the case of the embodiment shown in FIG. 1, the program is automatically operated. Incidentally, the operation macro recording unit 5600 is realized by, for example, an execution program to be run on PC's and/or WS's and an external memory such as hard disk connected to PC's and/or WS's. That is, the execution program records data to the external memory, loads data from the external memory and the rewrite data in the external memory.

When the operation macro recording unit 5600 records operations in predetermined layers as the macro operations from the tables of operation objects recorded in the operation object table recording unit 104. As an example, a case where the operation object table recording unit 104 stores the tables shown in FIGS. 21 to 48 and the operations in a second layer is recorded as the macro operations will be described. In this case, since operation objects in the second layer counted from the operation object of the table (FIG. 21) of the identifier $0 are four sub-menu's, the macro operation recording unit 5600 records them as the macro operations. FIG. 57 shows the recorded four macro operations. FIG. 57 indicates the macro operations recorded for the program of "A\sample\sample.exe" and that the macro operation No. 1 is the macro operation of the "Font" sub-menu indicating that it is possible to execute the macro operation by operating the "Letter" menu of the "Sample" window and then operating the "Font" sub-menu of the same window. The macro operations having other numbers are the same as that of the macro operation No. 1.

Figure 58:
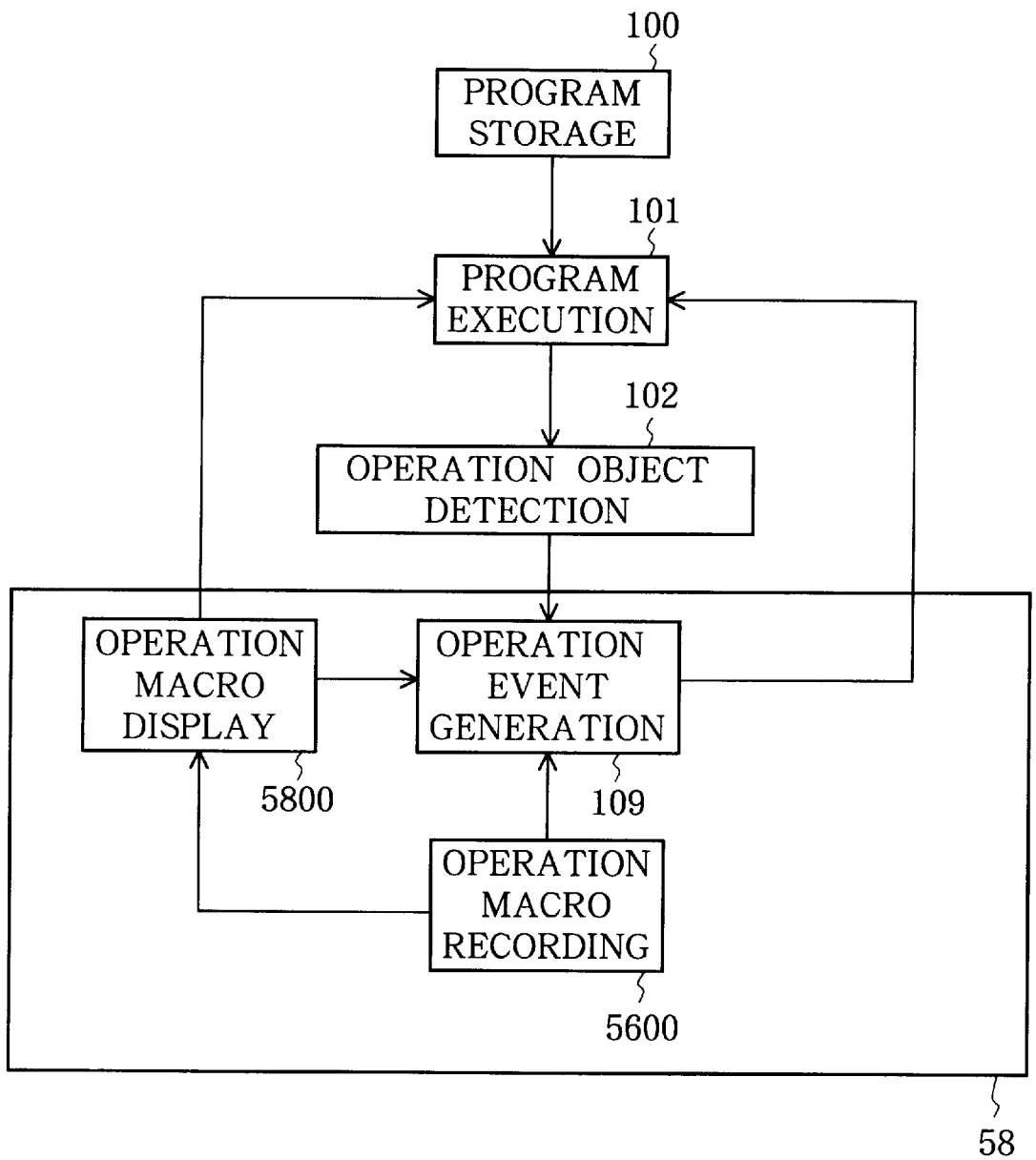
FIG. 58 shows a construction of an embodiment of an operation macro execution unit.

FIG. 58 shows a construction of an embodiment of an operation macro execution device according to the present invention. The operation macro execution device 58 comprises an operation macro recording unit 5600, an operation macro display unit 5800 and an operation event generator unit 5801 and is connected to a program execution unit 101 and an operation object detection unit 102. An execution program of the GUI system for which the operation macro is to be generated is stored in a program storage unit 100. In FIG. 58, the units other than the operation macro recording unit 5600, the operation macro display unit 5800 and the operation event generator unit 5801 are the same as those of the embodiment shown in FIG. 1. That is, the operation macro execution device 58 is a device for executing the operation macro generated by the automatic GUI system operation device 56 shown in FIG. 56. The operation macro display unit 5800 and the operation event generator unit 5801 are realized by, for example, an execution program to be executed on PC's and/or WS's.

Figure 59:
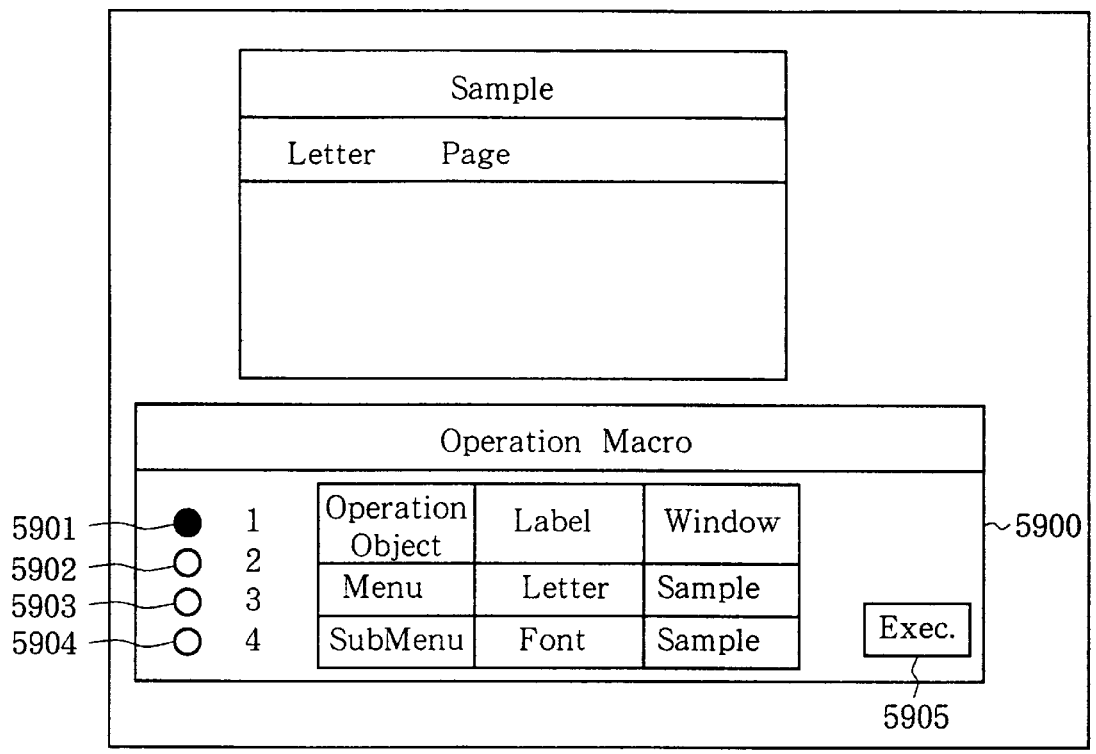
FIG. 59 shows an example of a system program and the operation macro displayed on the display screen.
Figure 60:
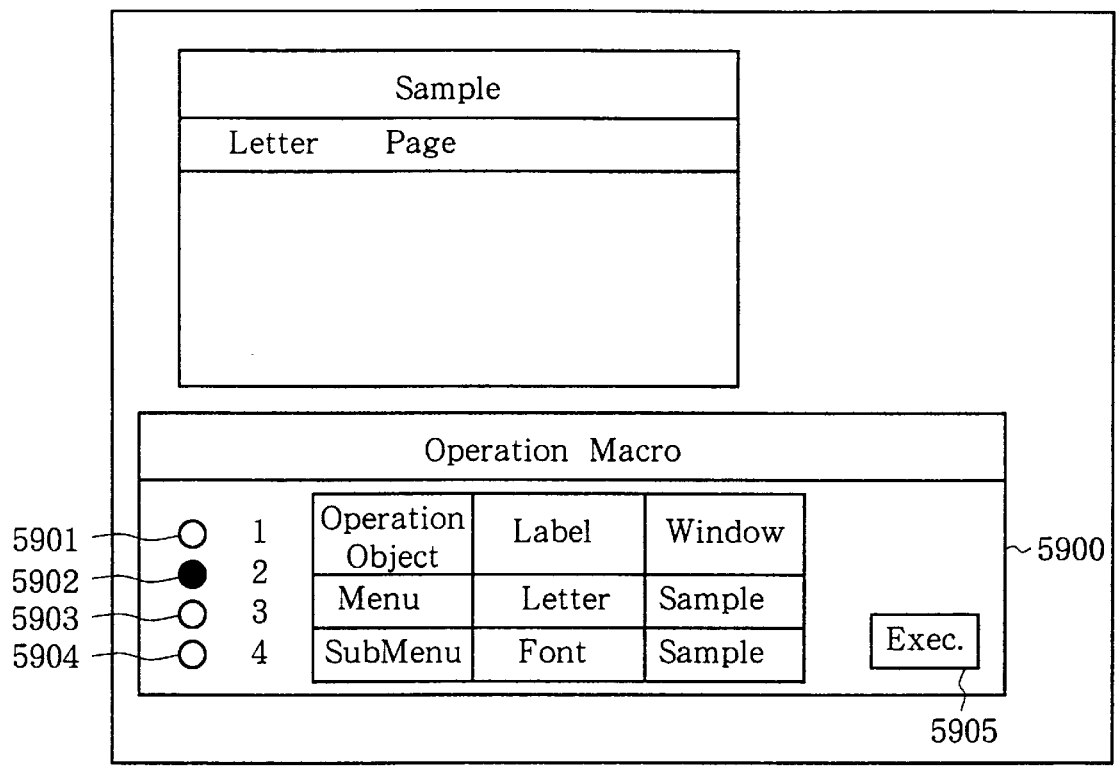
FIG. 60 shows an example of the system program and the operation macro displayed on the display screen.

When a user activates the program having the operation macro recorded therein, the operation macro display unit 5800 displays a window for facilitating the user to select and execute the operation macro on a display screen. For example, when the operation macro shown in FIG. 57 is recorded in the operation macro recording unit 5600, the operation macro is recorded for the program "A:\sample\sample.exe". Therefore, when the user activate the program "A:\sample\sample.exe", the operation macro display unit 5800 displays the operation macro shown in FIG. 57 on the display screen in the form of window. FIG. 59 shows an example of the operation macro display window. In FIG. 59, a reference numeral 5900 depicts the display window of the operation macro and four option buttons 5901 to 5904 represent the first to fourth operation macro's in FIG. 57. In the example shown in FIG. 59, the option button (5901) of the first operation macro is selected and the first operation macro is displayed within the operation macro display window 5900 in a table format. For example, when the user operates the option button (5902) of the second operation macro, the screen display becomes as shown in FIG. 60 in which the second operation macro is displayed on the operation macro display window 5900 in the table format.

Figure 61:
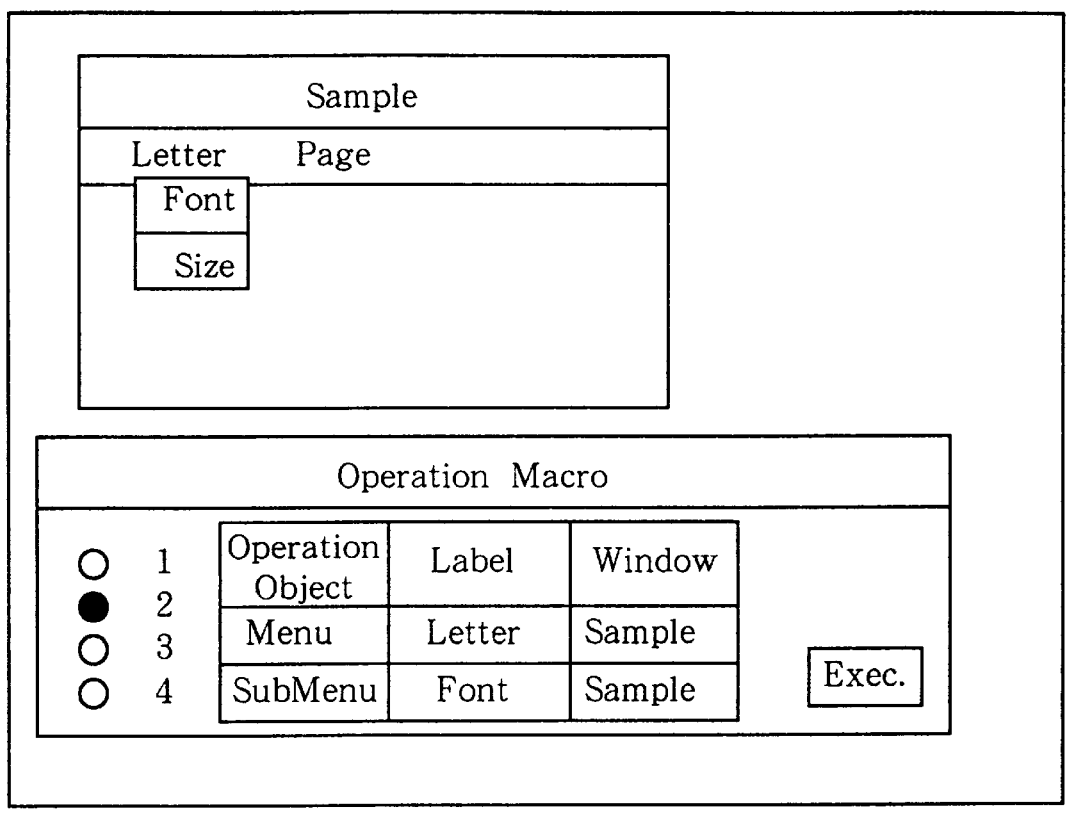
FIG. 61 shows an example of the system program and the operation macro displayed on the display screen.

Then, when the user operates the "Execution" push button 5905 on the operation macro display window 5900, the operation macro selected at this time is executed. As an example, a case where the second operation macro is executed will be described. When the user operates the "Execution" push button 5905 on the display screen shown in FIG. 60, the operation object detection unit 102 shown in FIG. 58 detects the operation object displayed on the display screen by the program execution unit 101 (the option buttons 5901 to 5904 and the push button 5905 on the "Operation Macro" window are also detected). Then, since the first operation object of the second operation macro is the "Letter" menu on the "Sample" window, the operation event generator unit 109 searches data of the "Letter" menu from the data of the operation object detected by the operation object detection unit 102, generates an event for operating this menu and outputs the thus generated operation event to the program execution unit 101. Thus, the display screen becomes as shown in FIG. 61. Further, the operation object detection unit 102 detects a next operation object again and, since the next operation object of the second operation macro is the "Letter" menu on the "Sample" window, the operation event generator unit 109 searches data of the "Size" sub-menu 701 from the data of the operation objects detected by the operation object detection unit 102 and this menu is operated. The second operation macro is automatically executed in this manner.

Therefore, with the automatic GUI system operation device 56 shown in FIG. 56 together with the operation macro execution device 58 shown in FIG. 58, it is possible to execute the operation of the objective system automatically and comprehensively, record data of the operation objects of the system automatically and comprehensively and automatically generate the operation macro on the basis of the recorded operation objects. Further, it is possible to make a user select the generated operation macro and automatically execute the selected operation macro. Therefore, it is possible to generate operation macro's before the user operates the system and provide them to the user.

As described above, according to the present invention, the following effects can be obtained.

According to the automatic GUI system operation device of the present invention, the automatic execution of the system becomes possible without the necessity of a preliminary description and reservation of procedures of a system operation by the user.

According to the automatic GUI system operation device with the GUI evaluation function of the present invention which is provided with the screen image recording unit, the operation of the system to be evaluated is automatically and comprehensively executed, the screen of the system is comprehensively shifted and the respective screen images are automatically recorded and output. Therefore, there is no need of system operation by the user. That is, it is possible to comprehensively confirm the system screen without it necessity of a manual input operation by the user regardless of the system size.

In the GUI system automatic device with the GUI evaluation function of the present invention which is provided with the operation object comparison unit, data of the operation objects of the system to be evaluated is automatically and comprehensively recorded by using only the system execution program. Therefore, the source program of the GUI portion of the system is unnecessary and it is possible to evaluate the consistency of the operation objects throughout the system by using only the system execution program.

In the automatic GUI system operation device with the GUI test function of the present invention which is provided with the operation error recording unit, the system operation error information is recorded by automatically and comprehensively executing the operation of the system to be tested by using only the execution program of the system to be tested. Therefore, the tester is not required to record or describe the script for automatically operating the system. That is, it becomes possible to comprehensively test the operation of the system without necessity of the works of the tester to record or describe the script, regardless of the system size.

In the automatic GUI system operation device with the operation macro generating function of the present invention which is provided with the operation macro recording unit, the operation of the objective system is automatically and comprehensively executed, data of the operation objects of the system is comprehensively recorded and the operation macro is automatically generated on the basis of the data of the recorded operation objects.

In the operation macro execution device according to the present invention, it is possible to execute the operation object existing on the screen of the system while automatically recognizing the operation object. Particularly, in the construction thereof in which the automatic GUI system operation device with the operation macro generating function, it is possible to generate the operation macro before the user operates the system and provide the operation macro to the user.

What is claimed is:

1. An automatic GUI system operation device that automatically operates a system having a GUI, and that is connected to program execution means for controlling an execution program of said system, and that is connected to operation object detection means for detecting operation objects of said system displayed on a display screen by said program execution means, comprising:

program execution start means for making said program execution means start an execution of said execution program of said system;

screen image recording means for recording an image on said display screen displayed by said program execution means;

operation object table recording means for producing tables of operation objects from data of operation objects detected by said operation object detection means and recording the tables of operation objects;

part table stack managing means for adding identifiers to a table stack of identifiers of the tables of operation objects or deleting identifiers from the table stack of identifiers of the tables of operation objects;

operation object selection means for selecting data of the operation objects from the tables of operation objects recorded in said operation object recording means;

operation event generation means for generating an event for executing an operation of operation objects of said system; and program execution end means for ending the execution of said execution program of said system which is being executed by said program execution means, wherein said operation object table recording means extracts data which is not recorded in said operation object table recording means from the data of the operation objects detected by said operation object detection means, produces the tables of operation objects by using the data and records the tables, instructs said table stack managing means to add identifiers of the newly recorded operation object table to the table stack, and, in a case where all of the data of the operation objects detected by said operation object detection means have been recorded in said operation object table recording means already, instructs said program execution means to terminate the execution of the execution program of said system which is being executed by means of said program execution means and, in a case where, in the data of the operation objects detected by said operation object detection means, there are data which are not recorded in said operation object table recording means as yet, instructs said operation object selection means to select data of operation objects from the tables of operation objects recorded in said operation object table recording means, wherein said operation object selection means searches the tables of operation objects having the top identifier in the table stack from said operation object table recording means, searches data of operation objects which are not operated as yet from the searched tables of operation objects and instructs said table stack managing means to select one of data of operation objects which are not operated as yet, if any, or to select one of data of operation objects from the tables of operation objects recorded in said operation object table recording means if there is no such data, or to delete the identifier in the top of the table stack until all identifiers in the table stack are deleted and then repeats the search processing of the data of the non-operated operation objects, wherein said operation event generator means generates an event for executing an operation of operation objects of said system using the data of operation objects selected by said operation object selection means and outputs it to said program execution means, wherein said program execution end means instructs said program execution start means to start the execution of said execution program of said system after the execution of said execution program of said system, which is being executed by said program execution means, is ended, wherein said program execution start means instructs said operation object selection means to select the data of operation objects, after it instructs said program execution means to start the execution of said execution program in response to the instruction from said program execution end means, and wherein, when one of data of non operated operation objects is selected in response to the instruction from said program execution start means instructing the selection of data of operation objects, said operation object selection means searches, from the tables of operation objects recorded in said operation object table recording means, data of operation objects to be executed in order to shift a content on said display screen from an initial content of said system till a content displaying the selected data of operation objects.

2. An automatic GUI system operation device as claimed in claim 1, further comprising screen image recording means for recording screen images displayed on said screen by said program execution means, wherein the tables of operation objects to be recorded in said operation object table recording means include at least identifiers of a operation object table, identifiers of the operations objects and coordinates of a display area of said screen on which the operation objects are displayed, and wherein said screen image recording means records an image of an initial screen of said system execution program after a first execution of said execution program of said system is started by said program execution start means and then records an image of said screen of said execution program of said system every time when said program execution means receives the operation event from said operation event generator means, after an operation of the execution program of said system executed by said operation event is completed.

3. An automatic GUT system operation device as claimed in claim 1, further comprising operation object comparing means for comparing data of the operation objects with each other in the tables of operation objects recorded in said operation object table recording means, wherein the operation object table recorded by said operation object table recording means includes identifiers of the tables of operation objects, identifiers of the operation objects, names of the operation objects, labels of the operation objects, coordinates of display areas of the operation objects, font name of label letters of the operation objects, sizes of the label letters of the operation objects and labels of windows on which the operation objects are located.

4. An automatic GUI system operation device as claimed in claim 1, further comprising operation error recording means for recording an operation error information by detecting an operation error when an operation error occurs in the execution program of said system which is being executed by said program execution means and an input operation is rejected, wherein the operation object table recorded by said operation object table recording means includes identifiers of the tables of operation objects, identifiers of the operation objects, names of the operation objects, labels of the operation objects, coordinates of display areas of the operation objects and labels of windows on which the operation objects are located, and wherein, the operation error is detected, said operation error recording means acquires, from said operation object selection means, data of an operation object executed immediately before the operation error occurs, records the thus acquired data of the operation object as an operation error information and instructs the program execution end means to stop the execution of the execution program of said system which is being executed by said program execution means.

5. An automatic GUI system operation device as claimed in claim 1, further comprising operation macro recording means for generating operation macro's on the basis of the tables of operation objects recorded in said operation object table recording means, wherein the operation object table recorded by said operation object table recording means includes identifiers of the tables of operation objects, identifiers of the operation objects, names of the operation objects, labels of the operation objects, coordinates of display areas of the operation objects and labels of windows on which the operation objects are located, and wherein said operation macro recording means records operation procedures for executing an operation object in a predetermined layer as an operation macro by using data of the operation objects in the tables of operation objects recorded in said operation object table recording means.

6. An automatic GUI system operation device that automatically operates a system having a GUI, and that is connected to a program execution unit for controlling an execution program of said system, and that is connected to operation object detection unit for detecting operation objects of said system displayed on a display screen by said program execution unit, comprising:

a program execution start unit for making said program execution unit start an execution of said execution program of said system;

a screen image recording unit for recording an image on said display screen displayed by said program execution unit;

an operation object table recording unit for producing tables of operation objects from data of operation objects detected by said operation object detection unit and recording the tables of operation objects;

a part table stack managing unit for adding identifiers to a table stack of identifiers of the tables of operation objects or deleting identifiers from the table stack of identifiers of the tables of operation objects;

an operation object selection unit for selecting data of the operation objects from the tables of operation objects recorded in said operation object recording unit;

an operation event generation unit for generating an event for executing an operation of operation objects of said system; and a program execution end unit for ending the execution of said execution program of said system which is being executed by said program execution unit, wherein said operation object table recording unit extracts data which is not recorded in said operation object table recording unit from the data of the operation objects detected by said operation object detection unit, produces the tables of operation objects by using the data and records the tables, instructs said table stack managing unit to add identifiers of the newly recorded operation object table to the table stack, and, in a case where all of the data of the operation objects detected by said operation object detection unit have been recorded in said operation object table recording unit already, instructs said program execution unit to terminate the execution of the execution program of said system which is being executed by unit of said program execution unit and, in a case where, in the data of the operation objects detected by said operation object detection unit, there are data which are not recorded in said operation object table recording unit as yet, instructs said operation object selection unit to select data of operation objects from the tables of operation objects recorded in said operation object table recording unit, wherein said operation object selection unit searches the tables of operation objects having the top identifier in the table stack from said operation object table recording unit, searches data of operation objects which are not operated as yet from the searched tables of operation objects and instructs said table stack managing unit to select one of data of operation objects which are not operated as yet, if any, or to select one of data of operation objects from the tables of operation objects recorded in said operation object table recording unit if there is no such data, or to delete the identifier in the top of the table stack until all identifiers in the table stack are deleted and then repeats the search processing of the data of the non-operated operation objects.

7. An automatic GUI system operation device as claimed in claim 6, further comprising a screen image recording unit for recording screen images displayed on said screen by said program execution unit, wherein the tables of operation objects to be recorded in said operation object table recording unit include at least identifiers of a operation object table, identifiers of the operation objects and coordinates of a display area of said screen on which the operation objects are displayed, and wherein said screen image recording unit records an image of an initial screen of said system execution program after a first execution of said execution program of said system is started by said program execution start unit and then records an image of said screen of said execution program of said system every time when said program execution unit receives the operation event from said operation event generator unit, after an operation of the execution program of said system executed by said operation event is completed.

8. An automatic GUI system operation device as claimed in claim 6, further comprising an operation object comparing unit for comparing data of the operation objects with each other in the tables of operation objects recorded in said operation object table recording unit, wherein the operation object table recorded by said operation object table recording unit includes identifiers of the tables of operation objects, identifiers of the operation objects, names of the operation objects, labels of the operation objects, coordinates of display areas of the operation objects, font name of label letters of the operation objects, sizes of the label letters of the operation objects and labels of windows on which the operation objects are located.

9. An automatic GUI system operation device as claimed in claim 6, further comprising an operation error recording unit for recording an operation error information by detecting an operation error when an operation error occurs in the execution program of said system which is being executed by said program execution unit and an input operation is rejected, wherein the operation object table recorded by said operation object table recording unit includes identifiers of the tables of operation objects, identifiers of the operation objects, names of the operation objects, labels of the operation objects, coordinates of display areas of the operation objects and labels of windows on which the operation objects are located, and wherein, the operation error is detected, said operation error recording unit acquires, from said operation object selection unit, data of an operation object executed immediately before the operation error occurs, records the thus acquired data of the operation object as an operation error information and instructs the program execution end unit to stop the execution of the execution program of said system which is being executed by said program execution unit.

10. An automatic GUI system operation device as claimed in claim 1, further comprising operation macro recording unit for generating operation macro's on the basis of the tables of operation objects recorded in said operation object table recording unit, wherein the operation object table recorded by said operation object table recording unit includes identifiers of the tables of operation objects, identifiers of the operation objects, names of the operation objects, labels of the operation objects, coordinates of display areas of the operation objects and labels of windows on which the operation objects are located, and wherein said operation macro recording unit records operation procedures for executing an operation object in a predetermined layer as an operation macro by using data of the operation objects in the tables of operation objects recorded in said operation object table recording unit.

* * * * *